US012737087B2

(12) United States Patent
Kim et al.

(10) Patent No.: US 12,737,087 B2
(45) **Date of Patent: *Sep. 15, 2026**

(54) TOUCH INPUT DEVICE

(71) Applicant: HIDEEP INC., Seongnam-si (KR)

(72) Inventors: Seyeob Kim, Seongnam-si (KR); Bonkee Kim, Seongnam-si (KR)

(73) Assignee: HiDeep Inc. (KR)

( * ) Notice: Subject to any disclaimer, the term of this patent is extended or adjusted under 35 U.S.C. 154(b) by 1 day.

This patent is subject to a terminal disclaimer.

(21) Appl. No.: 18/723,344

(22) PCT Filed: Nov. 28, 2022

(86) PCT No.: PCT/KR2022/018921
§ 371 (c)(1), (2) Date: Jun. 21, 2024

(87) PCT Pub. No.: WO2023/121023
PCT Pub. Date: Jun. 29, 2023

(65) Prior Publication Data

US 2025/0053269 A1 Feb. 13, 2025

(30) Foreign Application Priority Data

Dec. 23, 2021 (KR) ........................ 10-2021-0185633

(51) Int. Cl.
*G06F 3/044* (2006.01)
*G06F 3/0354* (2013.01)
(Continued)

(52) U.S. Cl.
CPC ........ *G06F 3/0446* (2019.05); *G06F 3/03545* (2013.01); *G06F 3/04162* (2019.05);
(Continued)

(58) Field of Classification Search
CPC ............... G06F 3/0446; G06F 3/03545; G06F 3/04162; G06F 3/0442; G06F 3/0445;
(Continued)

(56) References Cited

U.S. PATENT DOCUMENTS 11,487,395 B2 11/2022 Yang et al.
12,105,900 B2 * 10/2024 Kim ...................... G06F 3/0442
(Continued)

FOREIGN PATENT DOCUMENTS

JP 2017173985 A 9/2017
KR 10-2017-0111372 A1 10/2017
(Continued)

OTHER PUBLICATIONS

International Search Report of PCT/KR2022/018921, Issued on Jun. 29, 2023.

*Primary Examiner* — Patrick N Edouard
*Assistant Examiner* — Joseph P Fox
(74) *Attorney, Agent, or Firm* — The Belles Group, P.C.

(57) ABSTRACT

The present invention relates to a multi-functional touch input device capable of detecting a touch position, driving a stylus pen, and detecting the position of the stylus pen, the touch input device according to an embodiment of the present invention comprising a sensor unit and a control unit electrically connected to the sensor unit. In addition, provided is the touch input device capable of improving touch position sensing sensitivity by removing noise when detecting a touch position.

19 Claims, 14 Drawing Sheets

(51) Int. Cl.
*G06F 3/041* (2006.01)
*G06F 3/046* (2006.01)

(52) U.S. Cl.
CPC .......... *G06F 3/0442* (2019.05); *G06F 3/0445* (2019.05); *G06F 3/0448* (2019.05); *G06F 3/046* (2013.01)

(58) Field of Classification Search
CPC ...... G06F 3/0448; G06F 3/046; G06F 3/0418; G06F 3/0354
See application file for complete search history.

(56) References Cited

U.S. PATENT DOCUMENTS

| | | | | |
|---|---|---|---|---|
| 2014/0152621 | A1* | 6/2014 | Okayama | G06F 3/04182 345/174 |
| 2014/0176465 | A1 | 6/2014 | Ma et al. | |
| 2017/0083152 | A1* | 3/2017 | Gourevitch | G06F 3/0446 |
| 2019/0050110 | A1* | 2/2019 | King-Smith | G06F 3/0416 |
| 2021/0005677 | A1* | 1/2021 | Lee | G06F 3/0448 |
| 2022/0253173 | A1 | 8/2022 | Kim et al. | |

FOREIGN PATENT DOCUMENTS

| | | | |
|---|---|---|---|
| KR | 20180122761 | A | 11/2018 |
| KR | 20190114458 | A | 10/2019 |
| KR | 10-2020-0107019 | A | 9/2020 |
| KR | 20210076232 | A | 6/2021 |
| KR | 10-2021-0084838 | A1 | 7/2021 |
| KR | 10-2021-0127831 | A1 | 10/2021 |
| KR | 10-2021-0131780 | A | 11/2021 |
| KR | 10-2021-0141911 | A1 | 11/2021 |
| KR | 10-2021-0147926 | A | 12/2021 |

* cited by examiner

TOUCH INPUT DEVICE

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/KR2022/018921, filed Nov. 28, 2022, which claims priority to Korean Patent Application No. 10-2021-0185633, filed on Dec. 23, 2021, the entire disclosures of all of which are hereby incorporated by reference herein, for all purposes.

TECHNICAL FIELD

The present invention relates to a multi-functional touch input device capable of detecting a touch position, driving a stylus pen, and detecting a position of the stylus pen.

BACKGROUND ART

Various kinds of input devices are used to operate a computing system. For example, the input devices such as a button, a key, a joystick, and a touch screen are used. Since the touch screen is easily and simply operated, a touch input device including the touch screen is increasingly used when operating the computing system. Also, in recent years, a stylus pen may be additionally used when operating the touch input device.

FIG. 1 is a schematic view for explaining that an output voltage Vout of a capacitance to voltage amplifier (CVA) is varied according to a position of a stylus pen 10 on a flexible display panel in a typical electronic device.

Referring to FIG. 1, a reason why an output of the CVA is varied depending on the position of the pen 10 on the flexible display panel is that an impedance ratio of both sides based on the pen 10 on a sensing line is varied.

Based on a major axis of the typical flexible display panel, a resistance R of a metal mesh touch sensor is approximately 1.2 k ohm, and a capacitor C is approximately 250 pF.

Based on ten distributed models, at a driving frequency of 300 kHz, an impedance of the capacitor is approximately 200 times (120 ohm vs. $1/(2\pi*300\ k*25\ pF)=21\ k$ ohm) greater than a resistance thereof. Thus, the capacitor is a main factor.

FIG. 2 is a view for explaining through current sensing that output voltages Vout1 and Vout2 of the CVA are varied according to the position of the stylus pen 10 in FIG. 1, and FIG. 3 is a view for explaining through voltage sensing that the output voltages Vout1 and Vout2 of the CVA are varied according to the position of the pen 10 in FIG. 1.

Referring to FIGS. 2 and 3, the output voltages of the CVA are varied according to the position of the pen 10 on the sensing line. That is, the output voltage of the CVA increases as the pen 10 moves toward a sensing circuit unit 50 and decreases as the pen 10 moves away from the sensing circuit unit 50.

DISCLOSURE OF THE INVENTION

Technical Problem

The present invention provides a multi-functional touch input device capable of detecting a touch position, driving a stylus pen, and detecting a position of the stylus pen.

The present invention also provides a touch input device capable of improving touch position sensing sensitivity by removing noise when detecting a touch position.

Technical Solution

An embodiment of the present invention provide a touch input device including: a sensor unit; and a control unit electrically connected to the sensor unit, in which the sensor unit includes first to fourth patterns disposed together on the same layer, a plurality of first patterns arranged in first and second directions that are perpendicular to each other and each having an opening therein, in which the second pattern is disposed, at least one third pattern is disposed at each of both sides based on the first pattern and has an opening therein, in which the fourth pattern is disposed, the plurality of first patterns include first odd-numbered patterns and first even-numbered patterns arranged alternately in the first direction, the first odd-numbered patterns arranged in the first direction are electrically connected to each other, and the first even-numbered patterns arranged in the first direction are electrically connected to each other, the second patterns arranged in the first direction among the plurality of second patterns are electrically connected to each other, the second pattern disposed at the other edge among the second patterns arranged in the first direction is electrically connected to the second patterns arranged in the second direction, the third patterns arranged in the second direction among the plurality of third patterns are electrically connected to each other, the fourth patterns arranged in the second direction among the plurality of fourth patterns are electrically connected to each other, and the fourth pattern disposed at the other edge among the fourth patterns arranged in the second direction is electrically connected to the fourth patterns arranged in the first direction.

In another embodiment of the present invention, a touch input device includes: a sensor unit; and a control unit electrically connected to the sensor unit, in which the sensor unit includes first to fourth patterns disposed together on the same layer, a plurality of first patterns arranged in first and second directions that are perpendicular to each other and each having an opening therein, in which the second pattern is disposed, the second pattern has an opening in which the third pattern is disposed, the third pattern has an opening in which the fourth pattern is disposed, the plurality of first patterns include first odd-numbered patterns and first even-numbered patterns arranged alternately in the first direction, the first odd-numbered patterns arranged in the first direction are electrically connected to each other, the first even-numbered patterns arranged in the first direction are electrically connected to each other, the second patterns arranged in the first direction among the plurality of second patterns are electrically connected to each other, the second pattern disposed at the other edge among the second patterns arranged in the first direction is electrically connected to the second patterns arranged in the second direction, the third patterns arranged in the second direction among the plurality of third patterns are electrically connected to each other, the fourth patterns arranged in the second direction among the plurality of fourth patterns are electrically connected to each other, and the fourth pattern disposed at the other edge among the fourth patterns arranged in the second direction is electrically connected to the fourth patterns arranged in the first direction.

In another embodiment of the present invention, a touch input device includes: a sensor unit; and a control unit electrically connected to the sensor unit, in which the sensor unit includes first to fourth patterns disposed together on the same layer, a plurality of first patterns arranged in first and second directions that are perpendicular to each other and each having an opening therein, in which the second pattern is disposed, the third patterns has a shape extending in the second direction, is arranged to surround the first patterns arranged in the second direction, and has an opening in which the fourth pattern is arranged, the plurality of first patterns include first odd-numbered patterns and first even-numbered patterns arranged alternately in the first direction, the first odd-numbered patterns arranged in the first direction are electrically connected to each other, the first even-numbered patterns arranged in the first direction are electrically connected to each other, the second patterns arranged in the first direction among the plurality of second patterns are electrically connected to each other, the second pattern disposed at the other edge among the second patterns arranged in the first direction is electrically connected to the second patterns arranged in the second direction, and the plurality of fourth patterns have the other ends that are electrically connected to each other.

In another embodiment of the present invention, a touch input device includes: a sensor unit; and a control unit electrically connected to the sensor unit, in which the sensor unit includes first and second patterns arranged together on a first layer and third and fourth patterns arranged together on a second layer spaced apart from the first layer, a plurality of first patterns arranged in first and second directions that are perpendicular to each other and each having an opening therein, in which the second pattern is disposed, the third pattern has a shape extending in the second direction and has an opening in which the fourth pattern is disposed, the plurality of first patterns include first odd-numbered patterns and first even-numbered patterns arranged alternately in the first direction, the first odd-numbered patterns arranged in the first direction are electrically connected to each other, the first even-numbered patterns arranged in the first direction are electrically connected to each other, the second patterns arranged in the first direction among the plurality of second patterns are electrically connected to each other, the second pattern disposed at the other edge among the second patterns arranged in the first direction is electrically connected to the second patterns arranged in the second direction, and the plurality of fourth patterns have the other ends that are electrically connected to each other.

Advantageous Effects

The touch input device according to the embodiment of the present invention has the advantage of detecting the touch position, driving the stylus pen, and detecting the position of the stylus pen.

Also, the touch input device has the advantage of improving the touch position sensing sensitivity by removing the noise when detecting the touch position.

MODE FOR CARRYING OUT THE INVENTION

Figure 1:
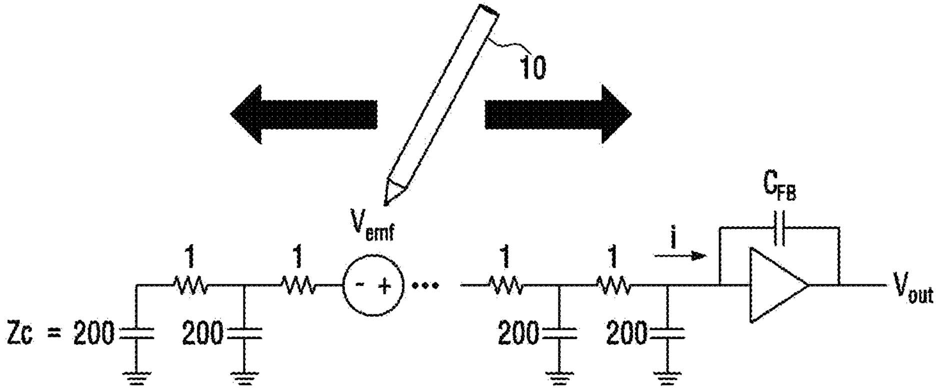
FIG. 1 is a schematic view for explaining that an output voltage Vout of a capacitance to voltage amplifier (CVA) is varied according to a position of a stylus pen 10 on a flexible display panel in a typical touch input device.
Figure 2:
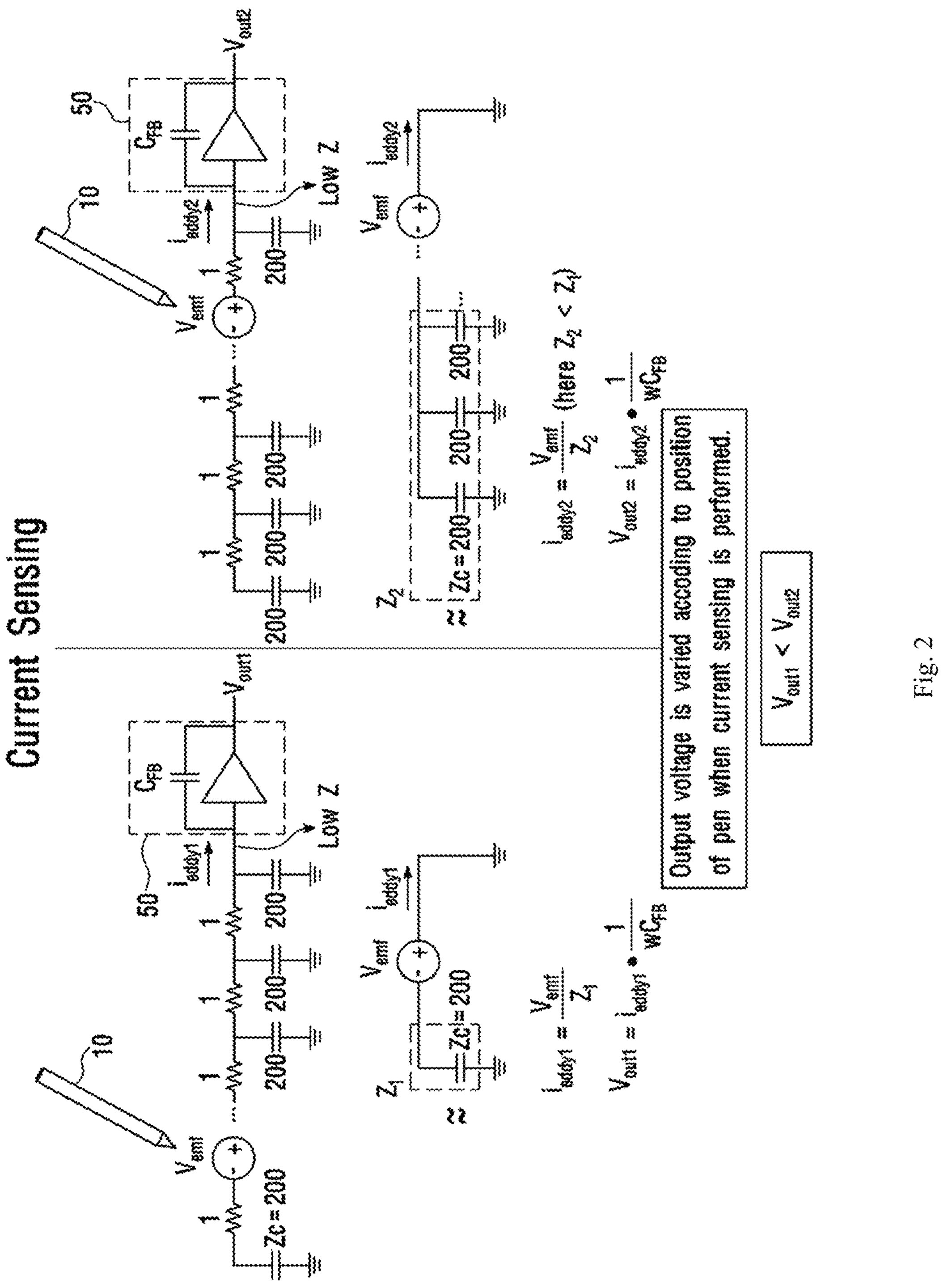
FIG. 2 is a view for explaining that output voltages Vout1 and Vout2 of the CVA are varied according to the position of the stylus pen 10 in FIG. 1 through current sensing.
Figure 3:
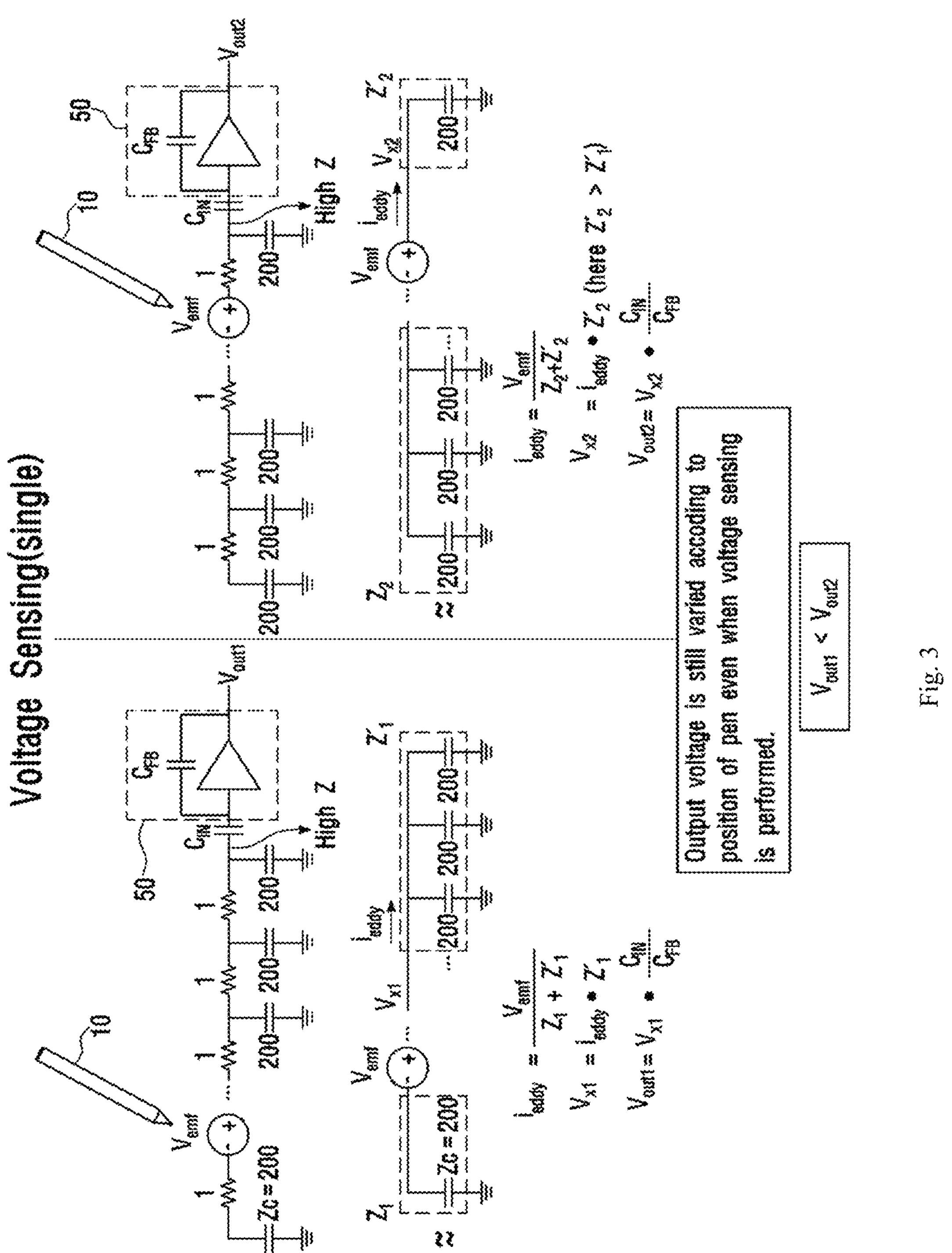
FIG. 3 is a view for explaining that the output voltages Vout1 and Vout2 of the CVA are varied according to the position of the stylus pen 10 in FIG. 1 through voltage sensing.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, as an electronic device, may be a touch input device such as a typical smartphone or a touch input device having a rectangular screen that is relatively greater than a screen of the typical smartphone and having a diagonal length of about 10 inches or more to about 13 inches or less. For example, the electronic device may include at least one of a foldable smartphone, a tablet personal computer, a vehicle display device, an e-book reader, a laptop personal computer, and a netbook computer.

Also, the touch input device according to various embodiments of the present invention may detect a position of an object such as a finger disposed on a screen, output a driving signal for driving a stylus pen, and detect a position of the stylus pen disposed on the screen by sensing a signal output from the stylus pen.

Hereinafter, various embodiments will be described in detail with reference to the accompanying drawings.

Figure 4:
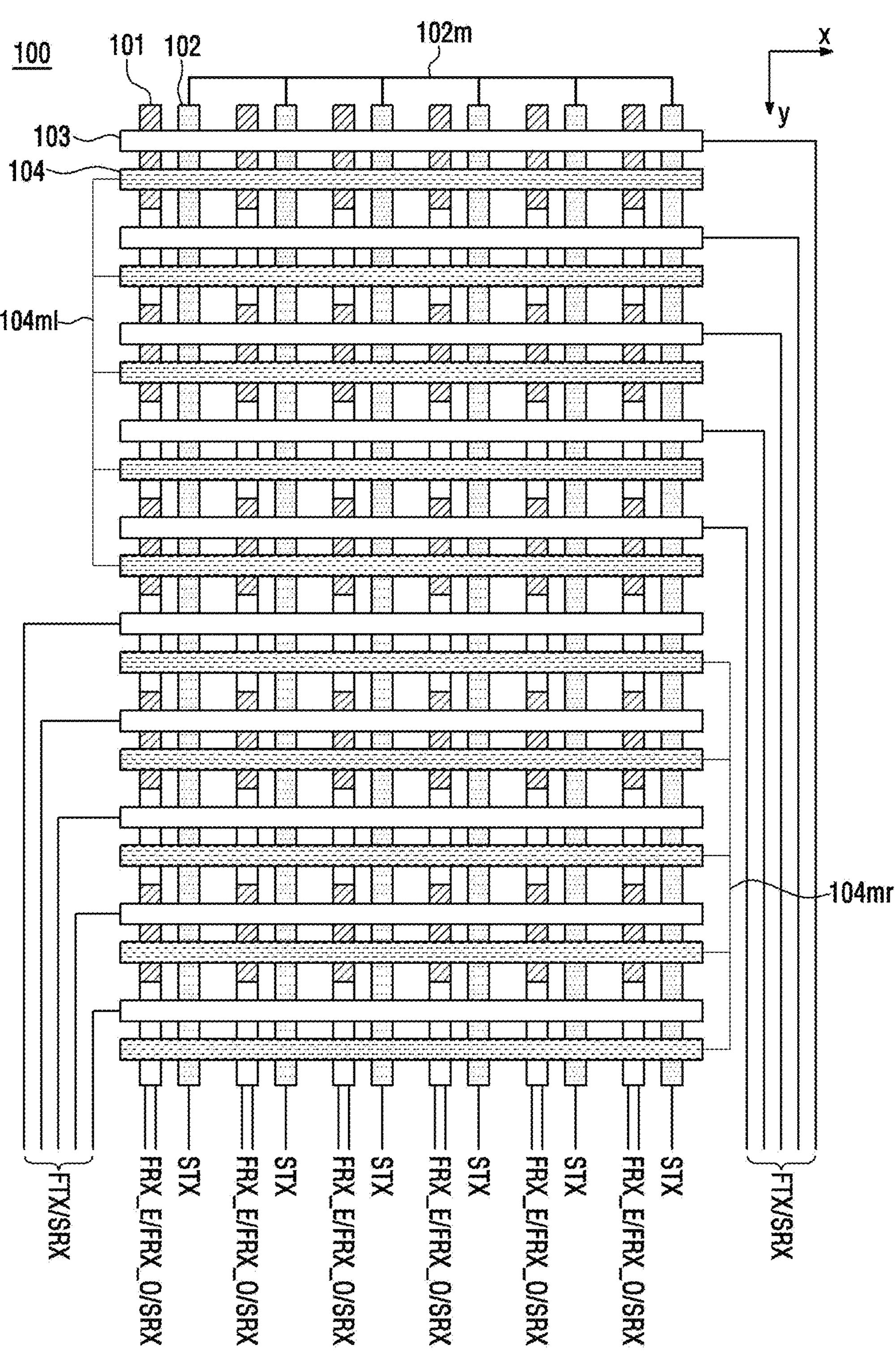
FIG. 4 is a schematic configuration view of a sensor unit 100 of the touch input device according to a first embodiment of the present invention.
Figure 5:
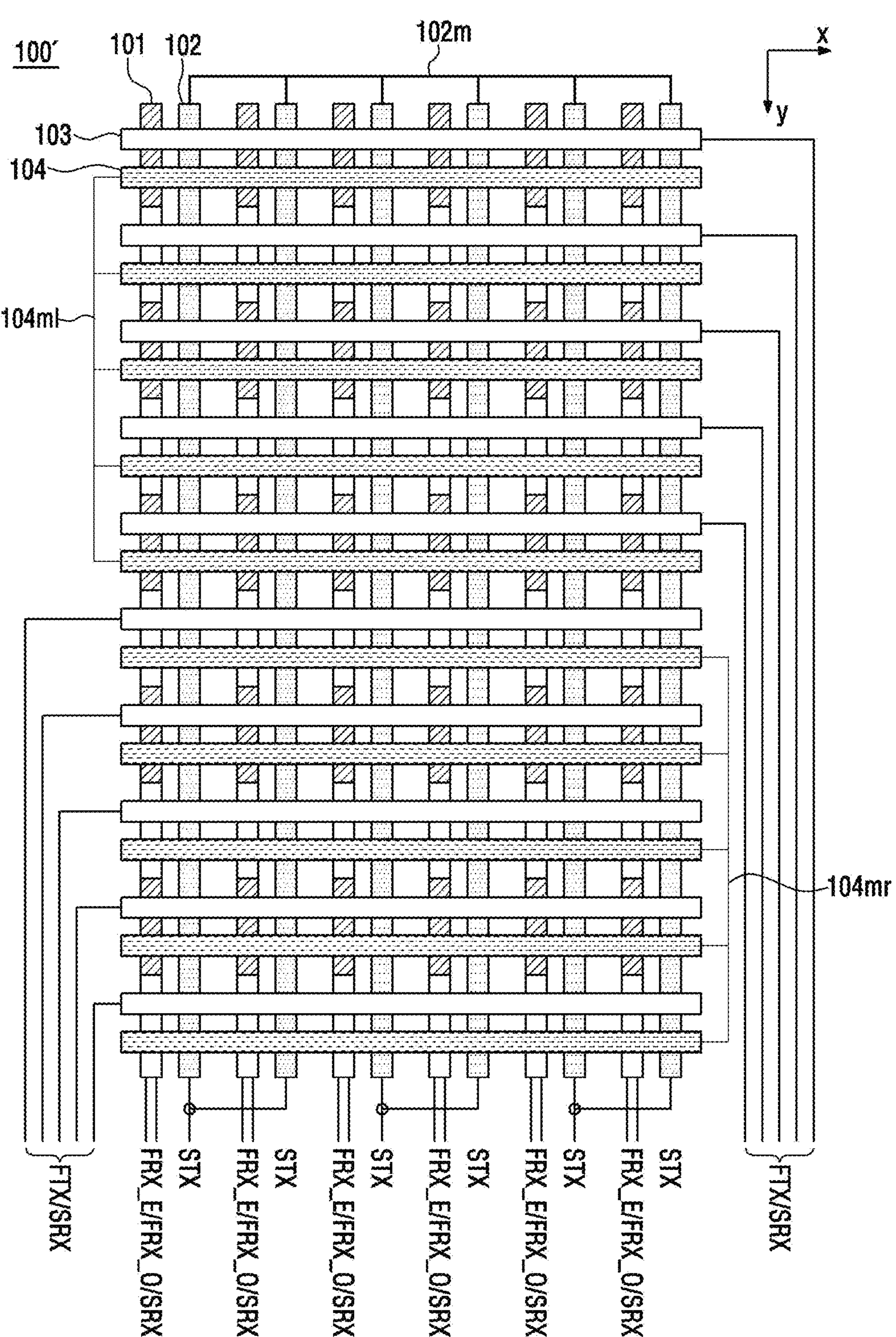
FIG. 5 is a view of a sensor unit 100' according to a modified example of the sensor unit 100 illustrated in FIG. 4.

FIG. 4 is a schematic configuration view of a sensor unit 100 of a touch input device according to a first embodiment of the present invention, and FIG. 5 is a view of a sensor unit 100' according to a modified example of the sensor unit 100 illustrated in FIG. 4.

The touch input device according to the first embodiment of the present invention may be a portrait-type touch input device. The portrait-type touch input device has a width less than a height thereof, and a control unit (not shown) that controls the sensor unit 100 is disposed below the sensor unit 100. For example, the portrait-type touch input device has a shape of a smartphone.

The sensor unit 100 may detect a position of an object such as a finger, which is disposed on the screen, drive the stylus pen disposed on the screen, and detect a position of the stylus pen disposed on the screen by sensing a signal emitted from the stylus pen.

The sensor unit 100 includes a plurality of patterns (or a plurality of electrodes).

The sensor unit 100 may include a plurality of first to fourth patterns 101, 102, 103, and 104.

Each of the first patterns 101 has a shape extending in an arbitrary first direction y. The first direction may be a direction of a major axis of the screen of the touch input device. The first pattern 101 may be also referred to as active TX (ATX).

Two conductive patterns may be connected to the first pattern 101. One conductive pattern may be an electrical path of a first touch sensing receiving channel FRX_E, and the other conductive pattern may be an electrical path of a second touch sensing receiving channel FRX_O. The one conductive pattern is electrically connected to odd-numbered first patterns included in the first patterns 101, and the other conductive pattern is electrically connected to even-numbered first patterns included in the first patterns 101. The odd-numbered first patterns and the even-numbered first patterns will be described with reference to FIGS. 8 to 16. Also, each of the above-described two conductive patterns may be also an electrical path of a stylus sensing channel SRX.

Each of the second patterns 102 has a shape extending in the first direction y, is disposed adjacent to the first pattern 101, and is spaced a predetermined distance from the first pattern 101. The second pattern 102 may be also referred to as dummy TX (DTX).

Each of the third patterns 103 has a shape extending in a second direction x different from the first direction. The second direction x may be a direction perpendicular to the first direction y, and may be a direction of a minor axis of the screen of the touch input device. The third pattern 103 may be also referred to as active RX (ARX).

Each of the fourth patterns 104 has a shape extending in the second direction x, is disposed adjacent to the third pattern 103, and is spaced a predetermined distance from the third pattern 103. The fourth pattern 104 may be also referred to as dummy RX (DRX).

The third and fourth patterns 103 and 104 are disposed on the first and second patterns 101 and 102 and are spaced a predetermined distance from the first and second patterns 101 and 102. Although not separately shown, the first to fourth patterns may be disposed on the same layer.

The plurality of first patterns 101 are arranged in the second direction x, and the plurality of second patterns 102 are also arranged in the second direction x. The plurality of third patterns 103 are arranged in the first direction y, and the plurality of fourth patterns 104 are also arranged in the first direction y.

Since the first pattern 101 extends in the first direction y, the third pattern 103 extends in the second direction x, and the first direction y is longer than the second direction x, the number of the plurality of first patterns 101 is less than the number of the plurality of third patterns 103. Thus, the number of channels of the plurality of first patterns 101 is less than that of channels of the plurality of third patterns 103.

Here, the number of the plurality of first patterns 101 and the number of the plurality of third patterns 103 may increase or decrease according to a size of the screen of the touch input device.

The number of the plurality of second patterns 102 may be equal to that of the plurality of first patterns 101. The other ends of the plurality of respective second patterns 102 may be electrically connected to each other through a conductive pattern **102*m*. Here, the conductive pattern 102*m*** may be a metal mesh or a silver trace.

One ends of the plurality of respective second patterns 102 may be individually connected to one conductive pattern. Here, the conductive pattern to which the one ends of the plurality of respective second patterns 102 are individually connected may be an electrical path of one stylus driving channel STX.

Here, as illustrated in FIG. 5, one ends of two or more second patterns 102 disposed adjacent to each other among the plurality of second patterns 102 may be electrically connected to each other through the conductive pattern. Due to this configuration, the number of channels of the plurality of second patterns 102 may be reduced to a half of the number of the channels of the plurality of first patterns 101.

Referring to FIG. 4 again, since the plurality of third patterns 103 are arranged in the first direction y, the number of the plurality of third patterns 103 is greater than that of the plurality of first patterns 101. Thus, the number of the channels of the plurality of third patterns 103 is greater than that of the channels of the plurality of first patterns 101.

One conductive pattern may be connected to one ends of the plurality of respective second patterns 103. The conductive pattern connected to the one ends of the plurality of respective second patterns 103 may be an electrical path of the touch sensing driving channel FTX and/or an electrical path of the stylus sensing channel SRX. Here, in consideration of widths of left and right bezels of the touch input device, a half of the plurality of third patterns 103 may be connected to a conductive pattern disposed at a right end, and a half of the rest third patterns 103 may be connected to a conductive pattern disposed at a left end.

The number of the plurality of fourth patterns 104 may be equal to that of the plurality of third patterns 103. The other ends of the plurality of respective second patterns 104 may be electrically connected to each other through conductive patterns **104*ml* and 104*mr*. Here, the conductive patterns 104*ml* and 104*mr* may include a left conductive pattern 104*ml* connecting left ends of the half of the fourth patterns 104 among the plurality of fourth patterns 104 and a right conductive pattern 104_mr_ connecting right ends of the rest half of fourth patterns. The left conductive pattern 104_ml_ and the right conductive pattern 104_mr_ may be arranged so as not to overlap or cross the conductive patterns connected to the plurality of third patterns 103**.

In the sensor unit 100 of the touch input device in FIG. 4, the plurality of first patterns 101 and the plurality of third patterns 103 basically sense a touch of an object such as a finger. To this end, the plurality of first patterns 101 may operate as touch driving electrodes to which a touch driving signal is applied, and the plurality of third patterns 103 may operate as touch sensing electrodes (or touch receiving electrodes) that receive a touch sensing signal, and vice versa.

Various combinations of the plurality of first to fourth patterns 101, 102, 103, and 104 may be used so that the sensor unit 100 of the touch input device in FIG. 4 drives and senses the stylus pen. The various combinations are shown in <Table 1> below. In <Table 1> below, '1' indicates the plurality of first patterns 101, '2' indicates the plurality of second patterns 102, '3' indicates the plurality of third patterns 103, and '4' indicates the plurality of fourth patterns 104.

One or two of the plurality of first to fourth patterns 101, 102, 103, and 104 may operate as a stylus driving electrode for driving the stylus pen. One or two of the plurality of first to fourth patterns 101, 102, 103, and 104 may be used to form a current loop for driving the stylus pen. An X-axis driving may be performed by one of the plurality of first patterns 101 and the plurality of second patterns 102, and a Y-axis driving may be performed by one of the plurality of third patterns 103 and the plurality of fourth patterns 104. The driving of the stylus pen may be performed by either the X-axis driving or the Y-axis driving or by both the X-axis driving and the Y-axis driving.

Two of the plurality of first to fourth patterns 101, 102, 103, and 104 may operate as a sensing electrode for sensing a stylus pen signal emitted from the stylus pen. Since both X-axis sensing and Y-axis sensing are required to sense the stylus pen signal, two of the plurality of first to fourth patterns 101, 102, 103, and 104 are used. The X-axis sensing may be performed by one of the plurality of first patterns 101 and the plurality of second patterns 102, and the Y-axis sensing may be performed by one of the plurality of third patterns 103 and the plurality of fourth patterns 104.

TABLE 1

| | Finger Touch Operation | | Stylus Operation | | | | Uplink signal magnitude | | Downlink signal magnitude | | Stylus additional channel | |
|---|---|---|---|---|---|---|---|---|---|---|---|---|
| | | | Driving | | Sensing | | | | | | | |
| No. | Driving Tx | Sensing Rx | Major axis | Minor axis | X-axis | Y-axis | Major axis | Minor axis | X-axis | Y-axis | Driving | Sensing |
| 1 | 1 | 3 | 2 | | 1 | 3 | Large | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 | | 1 | 3 | Small | | Small | Small | No | No |
| 14 | 1 | 3 | 1 | | 1 | 4 | Small | | Small | Large | No | Yes |
| 15 | 1 | 3 | 1 | | 2 | 3 | Small | | Large | Small | No | Yes |
| 16 | 1 | 3 | 1 | | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to <Table 1> above, in various combinations No. 1 to No. 32, the plurality of first patterns 101 and the plurality of third patterns 103 sense a touch of an object such as a finger. Specifically, the plurality of third patterns 103 operate as touch driving electrodes, and the plurality of first patterns 101 operate as touch receiving electrodes.

In the <Table 1> above, the 'magnitude of uplink signal' represents a magnitude of the driving signal for driving the stylus pen. When the same stylus pen driving signal is applied to each of the plurality of first patterns 101 and the plurality of second patterns 102, and magnitudes of signals received by the stylus pen are compared, the uplink signal is relatively greater when the stylus pen driving signal is applied to the plurality of second patterns 102 than when the stylus pen driving signal is applied to the plurality of first patterns 101.

This is because the other ends of the plurality of first patterns 101 are not electrically connected not to form a current loop while the other ends of the plurality of second patterns 102 are electrically connected to form at least one current loop when two or more second patterns to which the stylus pen driving signal is applied are properly selected. When current flows through each of the first patterns 101, since RC of each of the first patterns 101 is charged, the current may not flow smoothly from one end to the other end of each of the first patterns 101. Also, the stylus pen driving signal applied through the plurality of first patterns 101 is transmitted to the plurality of second patterns 101 in which the current loop is formed through capacitive coupling. Here, signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

In the <Table 1> above, the 'magnitude of downlink signal' represents a magnitude of the stylus pen signal received from the stylus pen. When the same stylus pen signal is received by each of the plurality of first patterns 101 and the plurality of second patterns 102, and magnitudes of the signals are compared, the downlink signal is relatively greater when the stylus pen signal is received by the plurality of second patterns 102 than when the stylus pen signal is received by the plurality of first patterns 101. This is because, although the other ends of the plurality of second patterns 102 are electrically connected to form a current loop, the other ends of the plurality of first patterns 101 are not electrically connected to each other, particularly, the stylus pen signal is transmitted to the plurality of first patterns 101 from the plurality of second patterns 101 in which the current loop is formed through the capacitive coupling, and thus attenuation of the downlink signal occurs.

Likewise, the downlink signal is relatively greater when the stylus pen signal is received through the plurality of fourth patterns 104 than when the stylus pen signal is received through the plurality of third patterns 103.

In the <Table 1> above, the 'stylus additional channel' represents whether an additional channel is provided for the stylus pen in addition to the touch sensing. When the plurality of second patterns 102 and/or the plurality of fourth patterns 104 are used for driving or sensing the stylus pen, an additional channel is required (marked by 'Yes' in the <Table 1>). Also, when the plurality of first patterns 101 and/or the plurality of third patterns 103 for touch sensing are used for driving or sensing the stylus pen, an additional channel is not required (marked by 'No' in the <Table 1>).

Hereinafter, some examples of the various combinations No. 1 to No. 32 of the <Table 1> above will be described in detail below. Here, combinations that are not described will be sufficiently understood by a person skilled in the art through following detailed descriptions.

In case of No. 1, the plurality of first patterns 101 are used as a stylus sensing electrode for sensing a stylus pen signal as well as a touch receiving electrode for sensing a touch of an object. The plurality of second patterns 102 are used as a stylus driving electrode for driving the stylus pen. The plurality of third patterns 103 are used as a stylus sensing electrode for sensing the stylus pen signal as well as a touch driving electrode for sensing the touch of the object. Also, the plurality of fourth patterns 104 are electrically floating.

In case of No. 1, since the plurality of second patterns 102 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of second patterns 102 are separately used as the stylus driving electrode, an additional channel for driving the stylus pen is required, but an additional channel for sensing the stylus pen is not required.

In case of No. 4, the plurality of first patterns 101 are used as the touch sensing electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch driving electrode for sensing the touch of the object. The plurality of fourth patterns 104 are used as the stylus sensing electrode for sensing the stylus pen signal.

In case of No. 4, since the plurality of second patterns 102 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus driving electrode and the stylus sensing electrode, and the plurality of fourth patterns 104 are separately used as the stylus sensing electrode, a separate additional channel for driving and sensing the stylus pen is required.

In case of No. 8, the plurality of first patterns 101 are used as the touch sensing electrode for sensing the touch of the object. The plurality of second patterns 102 are used as the stylus sensing electrode for sensing the stylus pen signal. The plurality of third patterns 103 are used as the touch driving electrode for sensing the touch of the object. Also, the plurality of fourth patterns 104 are used as the stylus sensing electrode for sensing the stylus pen signal as well as the stylus driving electrode for driving the stylus pen.

In case of No. 8, since the plurality of fourth patterns 104 are used as the stylus driving electrode, the uplink signal has a relatively large magnitude. Since the plurality of second patterns 102 and the plurality of fourth patterns 104 are used as the stylus sensing electrode, the downlink signal has a relatively large magnitude. Also, since the plurality of second patterns 102 are separately used as the stylus sensing electrode, and the plurality of fourth patterns 104 are separately used as the stylus driving electrode and the stylus sensing electrode, a separate additional channel for driving and sensing the stylus pen is required.

In case of No. 12, the plurality of first patterns 101 are used as the touch sensing electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch driving electrode for sensing the touch of the object. Also, the plurality of fourth patterns 104 are used as the stylus sensing electrode for sensing the stylus pen signal as well as the stylus driving electrode for driving the stylus pen.

In case of No. 12, since the plurality of second and fourth patterns 102 and 104 are used as the stylus driving electrode, the uplink signal has a relatively large magnitude. Since the plurality of second patterns 102 and the plurality of fourth patterns 104 are used as the stylus sensing electrode, the downlink signal has a relatively large magnitude. Also, since the plurality of second patterns 102 are separately used as the stylus driving electrode and the stylus sensing electrode, and the plurality of fourth patterns 104 are separately used as the stylus driving electrode and the stylus sensing electrode, a separate additional channel for driving and sensing the stylus pen is required.

Figure 6:
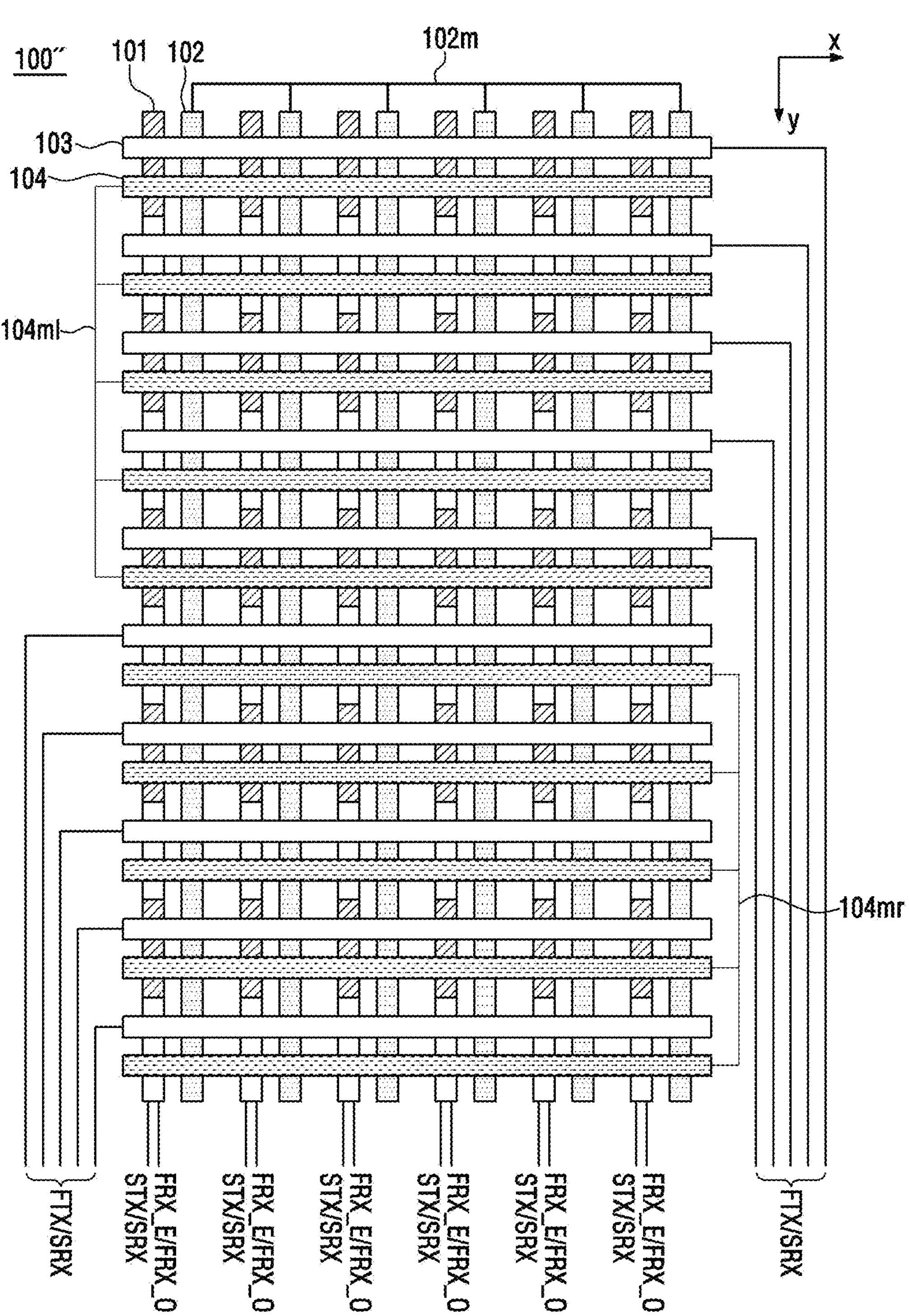
FIG. 6 is a view for explaining No. 13 of the Table 1, as a sensor unit 100" according to a modified example of the sensor unit 100 of the touch input device according to the first embodiment of the present invention in FIG. 4.

FIG. 6 is a view for explaining No. 13 of the Table 1, as a sensor unit 100" according to a modified example of the sensor unit 100 of the touch input device according to the first embodiment of the present invention in FIG. 4.

Referring to FIG. 6, in case of No. 13, the plurality of first patterns 101 are used as the touch sensing electrode for sensing the touch of the object, the stylus driving electrode for driving the stylus pen, and the stylus sensing electrode for sensing the stylus pen signal. The plurality of third patterns 103 are used as the stylus sensing electrode for sensing the stylus pen signal as well as the touch driving electrode for sensing the touch of the object. Also, the plurality of second and fourth patterns 102 and 104 are electrically floating.

In case of No. 13, since the plurality of first patterns 101 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of first patterns 101 are used as the stylus driving electrode and the stylus sensing electrode, and the plurality of third patterns 103 are used as the stylus sensing electrode, a separate additional channel for driving and sensing the stylus pen is not required.

In case of No. 17, the plurality of first patterns 101 are used as the stylus sensing electrode for sensing the stylus pen signal as well as the touch sensing electrode for sensing the touch of the object. The plurality of third patterns 103 are used as the touch driving electrode for sensing the touch of the object, the stylus driving electrode for driving the stylus pen, and the stylus sensing electrode for sensing the stylus pen signal. Also, the plurality of second and fourth patterns 102 and 104 are electrically floating.

In the case of No. 17, since the plurality of third patterns 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of second patterns 102 are used as the stylus sensing electrode, and the plurality of third patterns 103 are used as the stylus driving electrode and the stylus sensing electrode, a separate additional channel for driving and sensing the stylus pen is not required.

In case of No. 21, the plurality of first patterns 101 are used as the touch sensing electrode for sensing the touch of the object, the stylus driving electrode for driving the stylus pen, and the stylus sensing electrode for sensing the stylus pen signal. The plurality of third patterns 103 are used as the touch driving electrode for sensing the touch of the object, the stylus driving electrode for driving the stylus pen, and the stylus sensing electrode for sensing the stylus pen signal. Also, the plurality of second and fourth patterns 102 and 104 are electrically floating.

In case of No. 21, since the plurality of first and third patterns 101 and 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of first patterns 102 are used as the stylus driving electrode and the stylus sensing electrode, and the plurality of third patterns 103 are used as the stylus driving electrode and the stylus sensing electrode, a separate additional channel for driving and sensing the stylus pen is not required.

Among the various combinations No. 1 to No. 32 in the <Table 1> above, in Nos. 1, 5, 9, 25, and 29, driving is 'Yes' and sensing is 'No' in a column of 'Stylus additional channel'. In case of Nos. 1, 5, 9, 25, and 29, the plurality of first and third patterns 101 and 103 are used for sensing the stylus pen, and the plurality of second and/or fourth patterns 102 and 104 are used for driving the stylus pen. When the stylus pen is driven, since a magnetic field for resonating the stylus pen may be slightly difficult to be formed although the plurality of second and/or fourth patterns 102 and 104 are used, one ends of two or more adjacent second patterns may be electrically connected to each other as illustrated in FIG. 5. Likewise, one ends of two or more adjacent fourth patterns may be electrically connected to each other. This configuration has an advantage of reducing the additional channel for driving the stylus pen.

Figure 7:
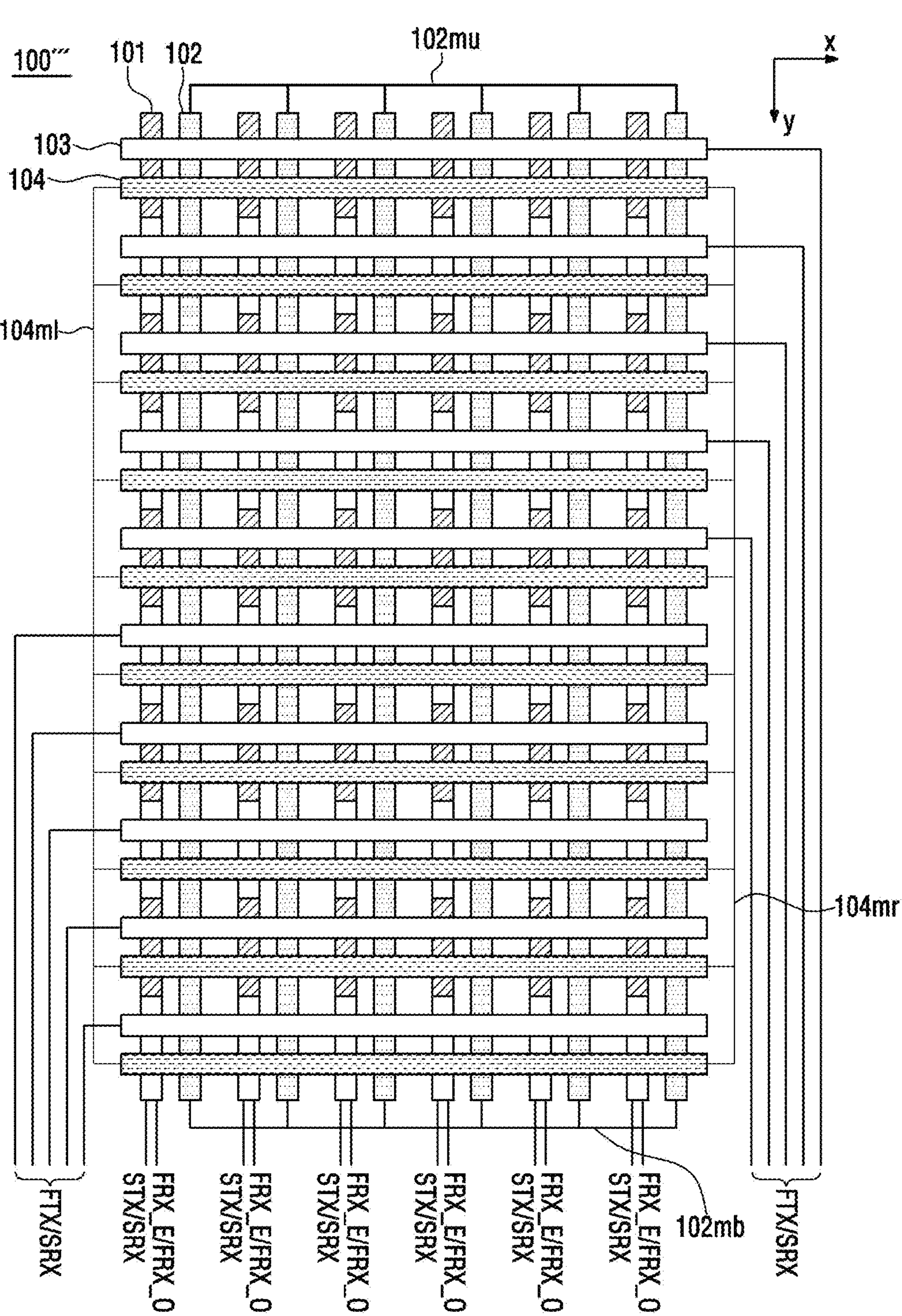
FIG. 7 is a schematic configuration view of a sensor unit 100" according to a modified example of the sensor unit 100 in FIG. 4.

FIG. 7 is a schematic configuration view of a sensor unit 100" according to a modified example of the sensor unit 100 in FIG. 4.

When compared with the sensor unit 100" in FIG. 6, the sensor unit 100' in FIG. 7 has a difference in terms of conductive patterns 102*mu* and 102*mb* that electrically connect a plurality of second patterns 102 and conductive patterns 104*ml* and 104*mr* that electrically connect a plurality of fourth patterns 104.

One ends of the plurality of second patterns 102 are electrically connected to each other through the conductive pattern 102*mb*, and the other ends of the plurality of second patterns 102 are electrically connected to each other through the conductive pattern 102*mu*. Thus, the plurality of second patterns 102 may form a whole electrical loop.

Likewise, one ends of the plurality of fourth patterns 104 are electrically connected to each other through the conductive pattern 102*mr*, and the other ends of the plurality of fourth patterns 104 are electrically connected to each other through the conductive pattern 102*ml*. Thus, the plurality of fourth patterns 104 may form a whole electrical loop.

Since the plurality of second patterns 102 and the plurality of fourth patterns 104 form the whole electrical loops, there is an advantage in that sensitivity of each of the uplink and downlink signals may be improved more than that of FIG. 6.

Figure 8:
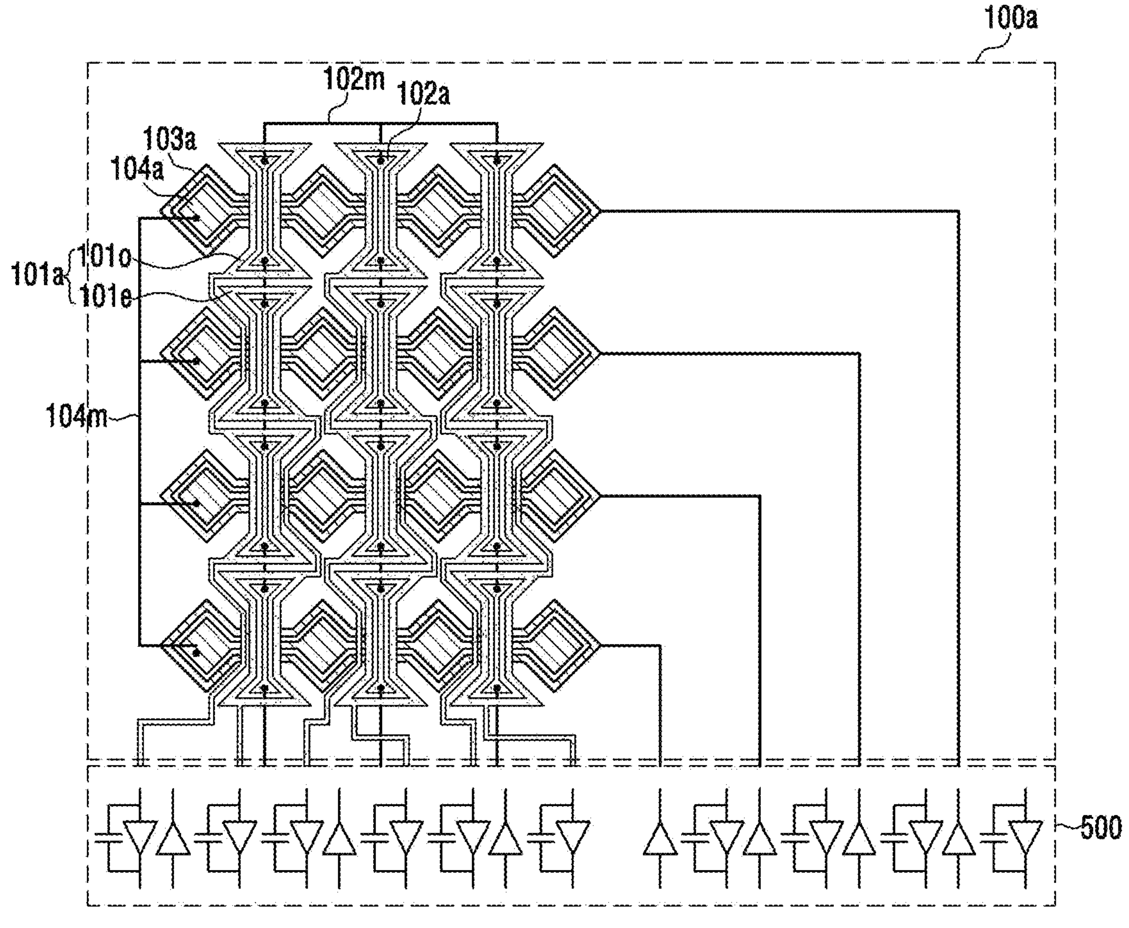
FIG. 8 is a view for explaining a touch input device according to a second embodiment of the present invention.

FIG. 8 is a view for explaining a touch input device according to a second embodiment of the present invention.

The touch input device in FIG. 8 may be a specified example of the touch input device in FIG. 4.

Referring to FIG. 8, the touch input device according to the second embodiment of the present invention includes a sensor unit 100*a* and a control unit 500.

The sensor unit 100*a* includes a plurality of first to fourth patterns 101*a*, 102*a*, 103*a*, and 104*a*.

The plurality of first patterns 101*a* are arranged in the first and second directions that are perpendicular to each other. Here, the first direction may be a direction of a major axis of a screen of the touch input device, and the second direction may be a direction of a minor axis of the screen of the touch input device.

Each of the first patterns 101 includes a first odd-numbered pattern 101*o* and a first even-numbered pattern 101*e*. The plurality of first patterns 101*a* include a plurality of first odd-numbered patterns 101*o* and a plurality of first even-numbered patterns 101*e*, and one first odd-numbered pattern

101*o* and one first even-numbered pattern 101*e* are arranged alternately in the first direction.

The plurality of first odd-numbered patterns 101*o* arranged in the first direction are electrically connected to each other by a plurality of conductive patterns, and the plurality of first even-numbered patterns 101*e* arranged in the first direction are also electrically connected to each other by a plurality of conductive patterns. Here, the plurality of first odd-numbered patterns 101*o* arranged in the second direction are not electrically connected to each other. Also, the plurality of first even-numbered patterns 101*e* arranged in the second direction are also not electrically connected to each other.

Each of the first odd-numbered pattern 101*o* and the first even-numbered pattern 101*e* may include an inverted triangle pattern, a triangle pattern, and a connection pattern that connects the inverted triangle pattern and the triangle pattern.

Each of the first odd-numbered pattern 101*o* and the first even-numbered pattern 101*e* may have an opening therein, in which at least one second pattern 102*a* is arranged. The opening may have a shape correspond to that of each of the first odd-numbered pattern 101*o* and the first even-numbered pattern 101*e*.

One first odd-numbered pattern 101*o* has a structure surrounding one second pattern 102*a* so as to be electrically insulated from each other, and one first even-numbered pattern 101*e* also has a structure surrounding one second pattern 102*a* so as to be electrically insulated from each other.

The plurality of first patterns 101*a* arranged in the first direction form the same electrical path as the first pattern 101 in FIG. 4. The plurality of first patterns 101*a* arranged in the first direction have two input/output channels (or terminals). One channel is a channel in which the plurality of first odd-numbered patterns 101*o* arranged in the first direction are electrically connected to each other by conductive patterns, and the other channel is a channel in which the plurality of second even-numbered patterns 101*e* arranged in the first direction are electrically connected to each other by conductive patterns Each of the two channels may be electrically connected to the control unit 500.

At least one of the second patterns 102*a* is disposed in each of the first odd-numbered pattern 101*o* and the first even-numbered pattern 101*e*.

The plurality of second patterns 102*a* arranged in the first direction are electrically connected to each other by a plurality of conductive patterns. Two second patterns disposed adjacent to each other in the first direction may be electrically connected to each other by one conductive pattern. The second pattern disposed at one edge among the plurality of second patterns 102*a* arranged in the first direction may be electrically connected to the control unit 500, and the second pattern 102*a* disposed at the other edge is electrically connected to the plurality of second patterns arranged in the second direction through the conductive pattern 102*m*. Through this, the same electrical connection path as the second pattern 102 in FIG. 4 may be configured.

The first pattern 101*a* and the second pattern 102*a* may be disposed on the same layer. The first pattern 101*a* and the second pattern 102*a* may be formed on the same layer by using a metal mesh.

The third pattern 103*a* has a shape extending in the second direction (or minor axis).

The third pattern 103*a* may include a plurality of diamond patterns and a connection pattern that connects two adjacent diamond patterns among the plurality of diamond patterns.

The third pattern 103*a* may have an opening in which the fourth pattern 104*a* is disposed.

The third pattern 103*a* may have a structure surrounding the fourth pattern 104*a*. The third pattern 103*a* is spaced a predetermined distance from the fourth pattern 104*a*. Through this, the third pattern 103*a* and the fourth pattern 104*a* are electrically insulated from each other.

The fourth pattern 104*a* is disposed adjacent to the third pattern 103*a*, has a shape extending in the second direction, and disposed in the third pattern 103*a*.

The fourth pattern 104A may include a plurality of diamond patterns and a connection pattern that connects two adjacent diamond patterns among the plurality of diamond patterns.

The plurality of third patterns 103*a* and the plurality of fourth patterns 104*a* are arranged in the first direction.

The plurality of third patterns 103 have one ends electrically connected to the control unit 500 and the other ends that are electrically opened.

One ends of the plurality of fourth patterns 104*a* may be electrically opened as illustrated in FIG. 8 or connected to the control unit 500 unlike FIG. 8. The other ends of the plurality of fourth patterns 104*a* may be electrically connected to each other through the conductive pattern 104*m*. Here, the other ends that are electrically connected to each other may be also grounded. When the other ends of the plurality of fourth patterns 104*a* are electrically connected to each other, since capacitance for each fourth pattern 104*a* is added, overall impedance may be reduced, and an effect similar to a case in which the other ends of the plurality of fourth patterns 104*a* are grounded may be exhibited.

The third pattern 103*a* and the fourth pattern 104*a* may be disposed on the same layer. The third pattern 103*a* and the fourth pattern 104*a* may be formed on the same layer by using a metal mesh. For example, the first pattern 101*a* and the second pattern 102*a* may be disposed on a first layer, and the third pattern 103*a* and the fourth pattern 104*a* may be disposed on a second layer that is different from the first layer.

The control unit 500 is electrically connected to the sensor unit 100*a* to control the sensor unit 100*a*. The control unit 500 and the sensor unit 100 may be electrically connected to each other through a conductive pattern.

The control unit 500 may include a plurality of driving circuit units and a plurality of sensing circuit units.

The plurality of driving circuit units may include a driving circuit unit for touch driving and a driving circuit unit for stylus driving.

The plurality of sensing circuit units may include a sensing circuit unit for touch sensing and a sensing circuit unit for stylus sensing. Here, some sensing circuit units among the plurality of sensing circuit units may perform touch sensing in addition to stylus sensing.

The control unit 500 may control the sensor unit 100*a* to be operated in one of a touch driving/sensing mode, an antenna driving mode, and a stylus sensing mode.

The control unit 500 may selectively electrically connect the plurality of driving/sensing circuit units to the sensor unit 100*a* according to each mode. To this end, the control unit 500 may include a plurality of switches for electrically connecting the plurality of driving/sensing circuit units and the sensor unit 100*a*.

Figure 9:
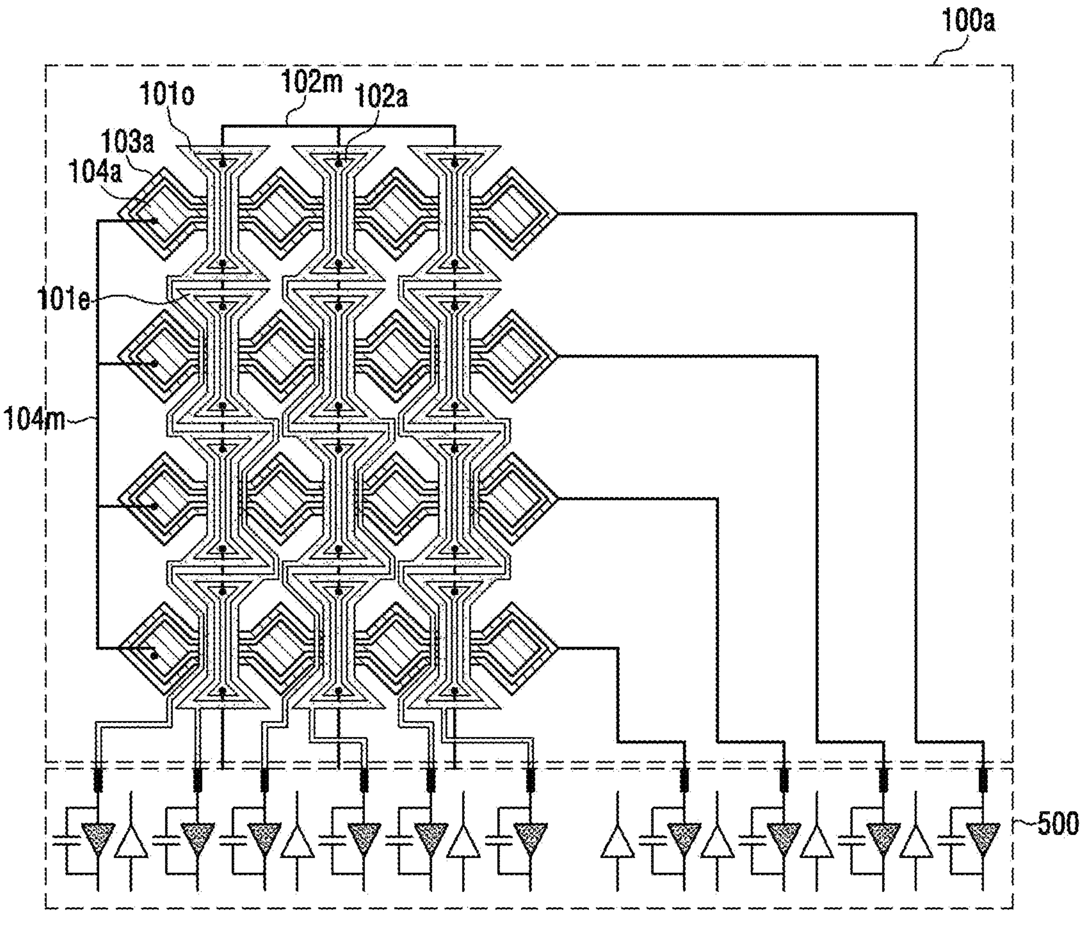
FIGS. 9 to 11 are views for explaining a feature of using a sensor unit **100*a* in FIG. 8** as No. 1 of the <Table 1> above.
Figure 10:
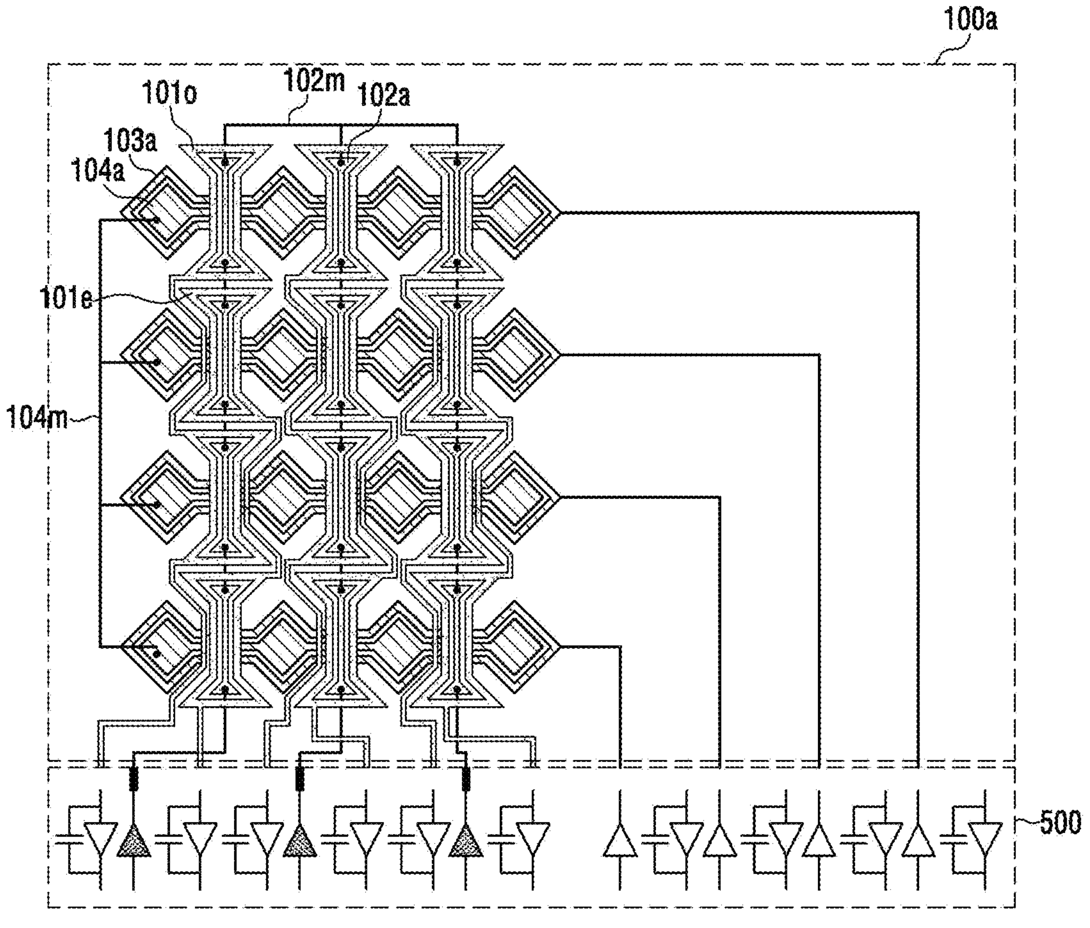
Figure 11:
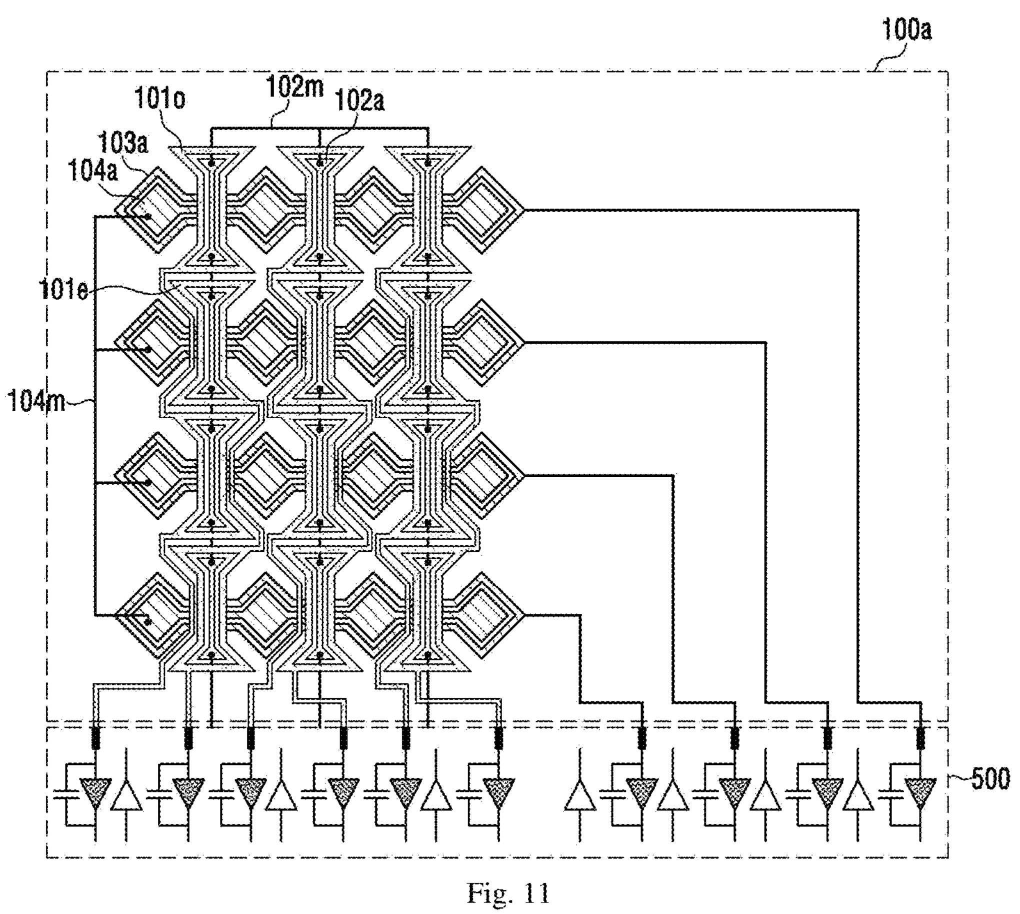

FIGS. 9 to 11 are views for explaining a feature of using the sensor unit 100*a* in FIG. 8 as No. 1 of the <Table 1> above.

FIG. 9 is a view illustrating a case in which the touch input device in FIG. 8 is operated in a touch driving/sensing mode (or 2D sensing mode), FIG. 10 is a view illustrating a case in which the touch input device in FIG. 8 is operated in an antenna driving mode (or stylus driving mode, or stylus uplink mode), and FIG. 11 is a view illustrating a case in which the touch input device in FIG. 8 is operated in a stylus sensing mode (or stylus downlink mode).

Referring to FIG. 9, in case of the touch driving/sensing mode, the control unit 500 may electrically connect the driving circuit unit for touch driving to the third patterns 103*a* of the sensor unit 100*a*. One driving circuit unit may be electrically connected to each of the plurality of the third patterns 103*a*.

The control unit 500 may electrically connect the sensing circuit unit for touch sensing to the plurality of first patterns 101*a* of the sensor unit 100*a*. Here, the plurality of first patterns 101*a* arranged in the first direction include the first odd-numbered patterns 101*o* and the second even-numbered patterns 101*e*, and the control unit 500 electrically connects the first odd-numbered patterns 101*o* arranged in the first direction and the second even-numbered patterns 101*e* arranged in the first direction, respectively.

The control unit 500 may apply a driving signal for touch driving to a predetermined third pattern 103*a* and receive two sensing signals from the first odd-numbered patterns 101*o* and the second even-numbered patterns 101*e* arranged in the first direction. The sensing circuit unit of the control unit 500 may output capacitance variation information contained in the two sensing signals as a predetermined voltage value. The control unit 500 may process the output voltage value to detect a touch position.

The control unit 500 may cancel display noise and LGM noise by subtracting a first sensing signal received from the plurality of first odd-numbered patterns 101*o* arranged in the first direction and a second sensing signal received from the plurality of first even-numbered patterns 101*e* arranged in the first direction from each other. Here, while the driving signal is sequentially applied to the plurality of third patterns 103*a*, when the third pattern 103*a* to which the driving signal is applied is directly adjacent to the first odd-numbered pattern 101*o*, the control unit 500 may subtract the second sensing signal from the first sensing signal, and when the third pattern 103*a* to which the driving signal is applied is directly adjacent to the second even-numbered pattern 101*e*, the control unit 500 may subtract the first sensing signal from the second sensing signal.

Here, the control unit 500 may control the same driving signal as that of the plurality of third patterns 103*a* to be applied to the plurality of fourth patterns 104*a* to prevent capacitive coupling from occurring between the third patterns 103*a* and the fourth patterns 104*a*. Alternatively, the control unit 500 may control a reference potential to be applied to the plurality of fourth patterns 104.

Referring to FIG. 10, in case of the antenna driving mode, the control unit 500 may electrically connect the driving circuit unit for antenna driving to the plurality of second patterns 102*a* of the sensor unit 100*a*.

The control unit 500 may control an antenna driving signal output from each driving circuit unit connected to the plurality of second patterns 102*a*. For example, the control unit 500 may control a first driving circuit unit to output a pulse signal having a predetermined frequency, a second driving circuit unit not to output a pulse signal, and a third driving circuit unit to output a pulse signal that is opposite to a pulse signal output from the first driving circuit unit. In this case, a current loop is formed by at least one second pattern 102*a* electrically connected to the first driving circuit unit and at least one second pattern electrically connected to the third driving circuit unit. A magnetic field may be generated by the formed current loop, and the stylus pen adjacent to the magnetic field may be resonated and driven by the magnetic field.

The control unit 500 may control opposite pulse signals to be output from two or more arbitrary driving circuit units among the plurality of driving circuit units electrically connected to the plurality of second patterns 102*a*. Thus, the control unit 500 may variously change and set a size and a position of the current loop. For example, when the control unit 500 detects a position of the stylus pen adjacent to the sensor unit 100*a*, the control unit 500 may control opposite signals to be output from the driving circuit unit electrically connected to at least two second patterns disposed around the position of the stylus pen, and when the control unit 500 does not detect the position of the stylus pen, the control unit 500 may control opposite signals to be output from the driving circuit unit electrically connected to two second patterns 102*a* disposed at both outermost portions among the plurality of second patterns 102*a*.

Referring to FIG. 11, in case of the stylus sensing mode, the control unit 500 may electrically connect the sensing circuit unit for stylus sensing to each of the plurality of first patterns 101*a* and the plurality of third patterns 103*a* of the sensor unit 100*a*.

In case of the stylus sensing mode, when the stylus pen approaches an arbitrary position on the sensor unit 100*a*, organic current is generated in some first patterns 101*a* and some third patterns 103*a* disposed around the stylus pen among the plurality of first patterns 101*a* and the plurality of third patterns 103*a* by the pen signal output from the stylus pen.

A reason why a predetermined inductive voltage occurs in the some first patterns 101*a* disposed around the stylus pen is that inductive current flows through some second patterns 102*a* disposed around the stylus pen by an electromagnetic induction phenomenon caused by the pen signal emitted from the stylus pen when the stylus pen approaches, and this is caused by a current loop formed by the plurality of second patterns 102*a*. Also, the inductive voltage occurs as the inductive current flowing through the some second patterns 102*a* flows over to the some first patterns 101*a* directly adjacent to the some second patterns 102*a* by capacitive coupling between the first patterns 101*a* and the second patterns 102*a*.

Likewise, a reason why a predetermined inductive voltage occurs in the some third patterns 103*a* disposed around the stylus pen is that inductive current flows through some fourth patterns 104*a* disposed around the stylus pen by an electromagnetic induction phenomenon caused by the pen signal emitted from the stylus pen when the stylus pen approaches, and this is caused by a current loop formed by the plurality of fourth patterns 104*a*. Also, the inductive voltage occurs as the inductive current flowing through the some fourth patterns 104*a* flows over to the some third patterns 103*a* directly adjacent to the some fourth patterns 104*a* by capacitive coupling between the third patterns 103*a* and the fourth patterns 104*a*.

The control unit 500 may detect the position of the stylus pen by sensing the inductive voltage through the some first patterns 101*a* and the some third patterns 103*a*. Here, each of the first patterns 101*a* may include the first odd-numbered patterns 101*o* and the first even-numbered patterns 101*e*, and the control unit 500 may detect the position of the stylus pen by summing a first sensing signal received from the plurality of first odd-numbered patterns 101_o_ and a second detection signal received from the plurality of first even-numbered patterns 101_e_.

Although the touch position of the object is sensed, and the stylus pen is driven and sensed by using the sensor unit 100_a_ of FIG. 8 in a method of No. 1 in the <Table 1> above in FIGS. 9 to 11, the sensor unit 100_a_ of FIG. 8 may also use one of methods No. 2 to No. 32 in the <Table 1> above.

Figure 12:
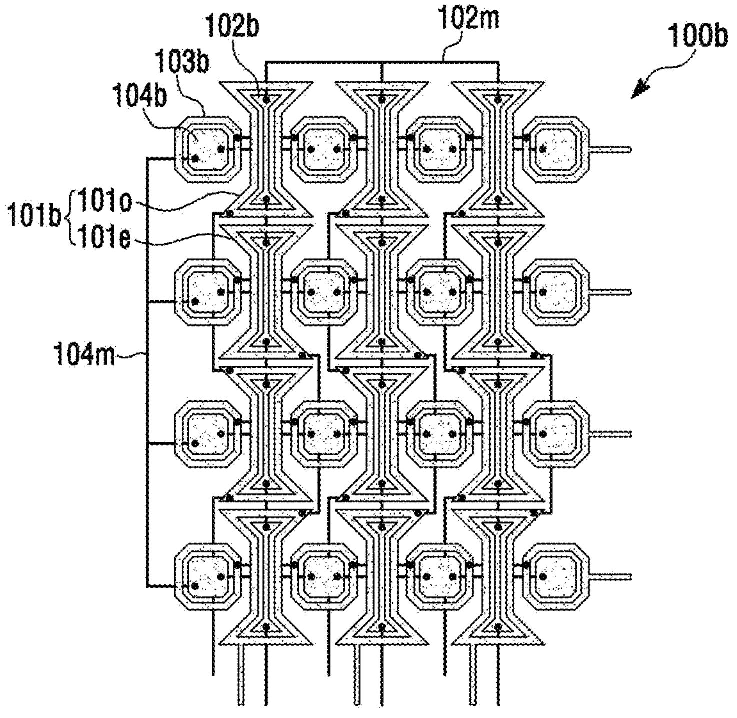
FIG. 12 is a view for explaining a sensor unit **100*b*** included in the touch input device according to a third embodiment of the present invention.

FIG. 12 is a view for explaining a sensor unit 100_b_ included in the touch input device according to the second embodiment of the present invention.

Referring to FIG. 12, the sensor unit 100_b_ includes a plurality of first to fourth patterns 101_b_, 102_b_, 103_b_, and 104_b_. The plurality of first to fourth patterns 101_b_, 102_b_, 103_b_, and 104_b_ are arranged together on the same floor, unlike the sensor unit 100_a_ in FIG. 8. In the sensor unit 100_a_ of FIG. 8, the first and second patterns 101_a_ and 102_a_ are arranged together on a first floor, and the third and fourth patterns 103_a_ and 104_a_ are arranged together on a second floor that is different from the first floor.

Since the plurality of first and second patterns 101_b_ and 102_b_ have the same structure and arrangement as the plurality of first and second patterns 101_a_ and 102_a_ of the sensor unit 100_a_ in FIG. 8, a detailed description thereof will be replaced with the above description. Hereinafter, a plurality of third and fourth patterns 103_b_ and 104_b_ will be described in detail.

The plurality of third patterns 103_b_ are arranged in the first and second directions. One third pattern 103_b_ is disposed at each of both sides of one first pattern 101_b_. One third pattern 103_b_ may be disposed at each of both sides with the first pattern 101_b_ therebetween.

The third pattern 103_b_ has a rectangular, polygonal, circular, or elliptical shape. The third pattern 103_b_ has an opening therein, in which one fourth pattern 104_b_ is disposed. The third pattern 103_b_ may have a closed curve shape in which the opening is formed.

The plurality of third patterns 103_b_ arranged in the second direction are electrically connected to each other by conductive patterns. Two third patterns disposed adjacent to each other in the second direction may be electrically connected to each other by one conductive pattern. On the other hand, the plurality of third patterns 103_b_ arranged in the first direction are not electrically connected to each other. The plurality of third patterns 103_b_ disposed adjacent to each other in the first direction different from the second direction may be also electrically connected to each other by conductive patterns.

Each of the plurality of fourth patterns 104_b_ is disposed in one third pattern 103_b_. One fourth pattern 104_b_ is surrounded by one third pattern 103_b_. The fourth pattern 104_b_ may have a shape corresponding to that of the opening of the third pattern 103_b_. The fourth pattern 104_b_ may have a rectangular, polygonal, circular, or elliptical shape. The fourth pattern 104_b_ may have a plate shape in which an opening is not formed.

The plurality of fourth patterns 104_b_ arranged in the second direction are electrically connected to each other by conductive patterns. Two fourth patterns disposed adjacent to each other in the second direction may be electrically connected to each other by one conductive pattern. The fourth pattern disposed at one edge among the plurality of fourth patterns 104_b_ arranged in the second direction may be electrically connected to the control unit in FIG. 8, and the fourth pattern 104_b_ disposed at the other edge is electrically connected to the plurality of fourth patterns arranged in the first direction through the conductive pattern 104_m_. Through this, the same electrical connection path as the fourth pattern 104 in FIG. 4 may be configured.

The sensor unit 100_b_ in FIG. 12 may replace the sensor unit 100_a_ in FIG. 8. Thus, the sensor unit 100_b_ in FIG. 12 may also sense the touch position of the object, and drive and sense the stylus pen by using various methods described in the <Table 1> above. Specifically, when the sensor unit 100_a_ in FIGS. 9 to 11 is replaced with the sensor unit 100_b_ in FIG. 12, the touch input device including the sensor unit 100_b_ and control unit 500 in FIG. 12 may perform the touch driving/sensing mode described in FIG. 9, the antenna driving mode described in FIG. 10, and the stylus sensing mode described in FIG. 11 in the same manner. Furthermore, the sensor unit 100_b_ in FIG. 12 may be used in one of the methods No. 2 to No. 32 of the <Table 1> above.

Figure 13:
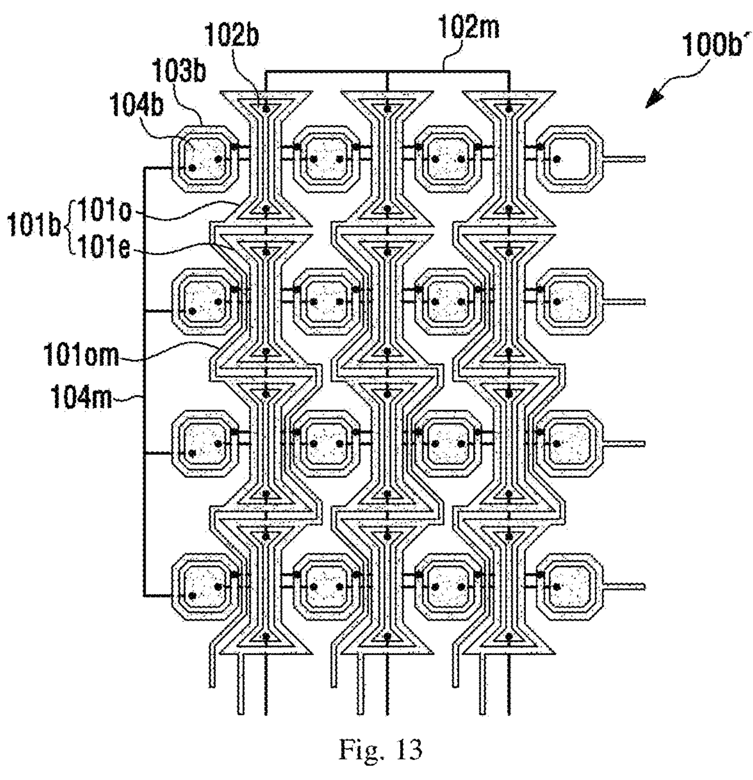
FIG. 13 is a view for explaining a modified example of the sensor unit **100*b* in FIG. 12**.

FIG. 13 is a view for explaining a modified example of the sensor unit 100_b_ in FIG. 12.

First to fourth patterns 101_b_, 102_b_, 103_b_, and 104_b_ of a sensor unit 100_b_' in FIG. 13 have the same structure and shape as those of the first to fourth patterns 101_b_, 102_b_, 103_b_, and 104_b_ of the sensor unit 100_b_ in FIG. 12. Thus, a description of the structure and shape of the first to fourth patterns 101_b_, 102_b_, 103_b_, and 104_b_ is replaced with the above description.

The sensor unit 100_b_' in FIG. 13 has a difference from the sensor unit 100_b_ in FIG. 12 in terms of a conductive pattern 101_om_ that electrically connects two first odd-numbered patterns 101_o_ disposed adjacent to each other and two first even-numbered patterns 101_e_ disposed adjacent to each other in the first direction of the first pattern 101_b_.

The conductive pattern 101_om_ is arranged to bypass so as not to cross the third and fourth patterns 103_b_ and 104_b_. Also, the conductive pattern 101_om_ may be arranged to cross conductive patterns that electrically connect two third and fourth patterns 103_b_ and 104_b_ disposed adjacent to each other in the second direction.

In the sensor unit 100_b_ of FIG. 12, since the conductive pattern that electrically connect two first odd-numbered patterns 101_o_ disposed adjacent to each other and two adjacent first even-numbered patterns 101_e_ disposed adjacent to each other in the first direction has a shape in which the rest portion except both ends extends linearly in the first direction, the conductive pattern has a portion overlapping the third and fourth patterns 103_b_ and 104_b_. A predetermined capacitance may be formed between the conductive pattern and the third and fourth patterns 103_b_ and 104_b_ in the overlapping portion. The predetermined capacitance may give an effect on touch sensing or stylus sensing sensitivity and may also give an effect on an operation frequency bandwidth.

On the other hand, since the conductive pattern 101_om_ of FIG. 13 is disposed to bypass the third pattern 103_b_ instead of overlapping the third and fourth patterns 103_b_ and 104_b_, the above-described capacitance may not be formed to reduce the effect on the touch sensing and the stylus sensing sensitivity and also reduce the effect on the operation frequency bandwidth.

On the other hand, since the conductive pattern of FIG. 12 is shorter in length than the conductive pattern 101_om_ of FIG. 13, the conductive pattern of FIG. 12 has a resistance less than that of the conductive pattern 101_om_ of FIG. 13.

Figure 14:
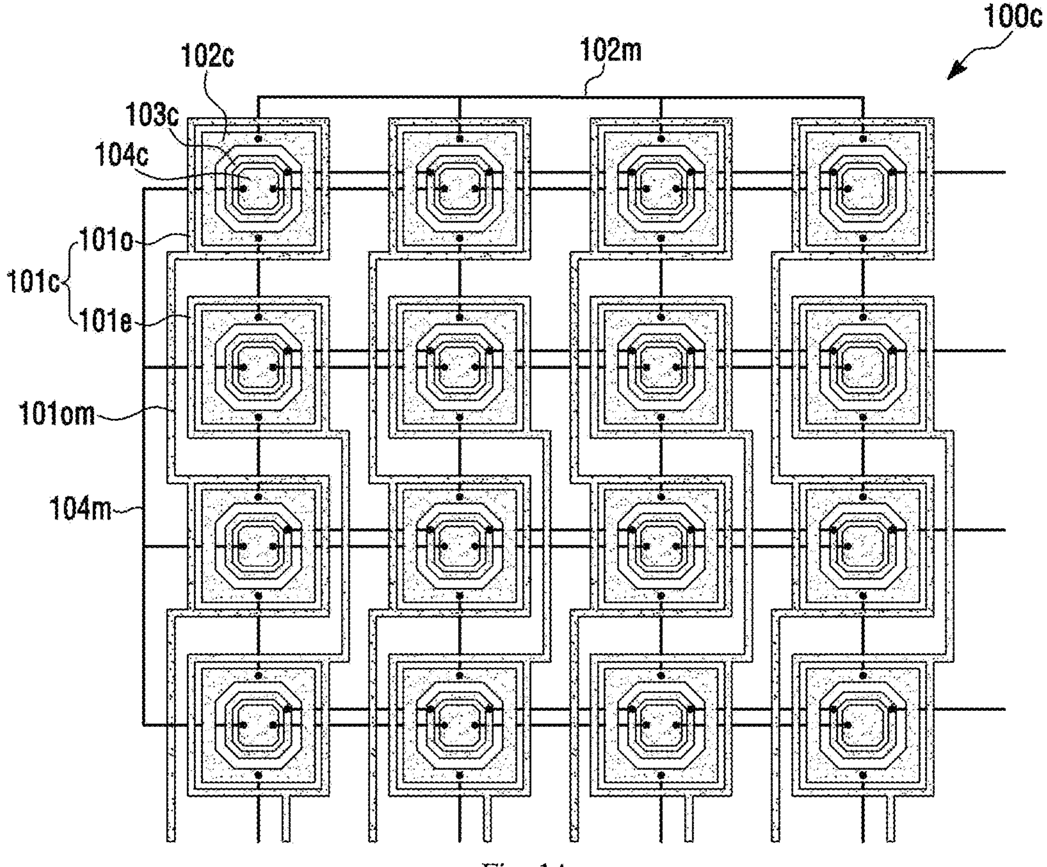
FIG. 14 is a view for explaining a sensor unit **100*c*** included in the touch input device according to the third embodiment of the present invention.

FIG. 14 is a view for explaining a sensor unit 100_c_ included in a touch input device according to a third embodiment of the present invention.

Referring to FIG. 14, the sensor unit 100_c_ includes a plurality of first to fourth patterns 101_c_, 102_c_, 103_c_, and 104_c_. The plurality of first to fourth patterns 101_c_, 102_c_,

103*c*, and 104*c* are arranged together on the same floor in the same manner as the sensor units 100*b* and 100*b*' in FIGS. 12 and 13.

Since the plurality of third and fourth patterns 103*c* and 104*c* have the same structure and arrangement shape as the plurality of third and fourth patterns 103*b* and 104*b* of the sensor unit 100*b* in FIG. 12, a detailed description thereof will be replaced with the above description. Hereinafter, a plurality of first and second patterns 101*c* and 102*c* will be described in detail.

Each of the plurality of second patterns 102*c* is arranged to surround one third pattern 103*c*. One second pattern 102*b* has an opening therein, in which one third pattern 103*c* is disposed.

Each of the plurality of first patterns 101*c* is arranged to surround one second pattern 102*c*. One first pattern 101*c* has an opening therein, in which one second pattern 102*c* is disposed.

One second pattern 102*c* is disposed in one first pattern 101*c*, one third pattern 103*c* is disposed in one second pattern 102*c*, and one fourth pattern 104*c* is disposed in one third pattern 103*c*.

The first pattern 101*c* may have a shape corresponding to that of the second pattern 102*c*, and the third pattern 103*c* may have a shape corresponding to that of the third pattern 104*c*. Alternatively, the first to fourth patterns 101*c*, 102*c*, 103*c*, and 104*c* may have shapes corresponding to each other.

Although each of the first and second patterns 101*c* and 102*c* may have a rectangular shape, the embodiment of the present invention is not limited thereto. For example, each of the first and second patterns 101*c* and 102*c* may have a polygonal, circular, or elliptical shape.

The first pattern 101*c* includes first odd-numbered patterns 101*o* arranged at odd-numbered positions in the first direction and first even-numbered patterns 101*e* arranged at even-numbered positions in the first direction.

The plurality of first odd-numbered patterns 101*o* arranged in the first direction are electrically connected to each other through the conductive patterns 101*om*, and the plurality of first even-numbered patterns 101*e* arranged in the first direction are electrically connected to each other through the conductive patterns.

The conductive pattern 101*om* that electrically connects two first odd-numbered patterns 101*o* arranged in the first direction is disposed adjacent to one side of the first even-numbered pattern 101*e* disposed between the two first odd-numbered patterns 101*o*.

Also, the conductive pattern that electrically connects two first even-numbered patterns 101*e* arranged in the first direction is also disposed adjacent to the other side of the first odd-numbered pattern disposed between the two first even-numbered patterns 101*e*.

The above-described arrangement of the conductive pattern 101*om* may allow the sensor unit 100*c* in FIG. 14 to have an advantage of minimizing resistance by minimizing a length of the conductive pattern 101*om* and also minimizing capacitance because the conductive pattern 101*om* does not overlap another pattern. That is, the sensor unit 100*c* in FIG. 14 may have an advantage of minimizing resistance of the sensor unit 100*b* in FIG. 12 and also minimizing capacitance of the sensor unit 100*b*' in FIG. 13.

The plurality of second patterns 102*c* arranged in the first direction are electrically connected to each other by a plurality of conductive patterns. Two second patterns disposed adjacent to each other in the first direction may be electrically connected to each other by one conductive pattern. The second pattern disposed at one edge among the plurality of second patterns 102*c* arranged in the first direction may be electrically connected to the control unit in FIG. 8, and the second pattern 102*c* disposed at the other edge is electrically connected to the plurality of second patterns arranged in the second direction through the conductive pattern 102*m*. Through this, the same electrical connection path as the second pattern 102 in FIG. 4 may be configured.

The sensor unit 100*c* in FIG. 14 may replace the sensor unit 100*a* in FIG. 8. Thus, the sensor unit 100*c* in FIG. 14 may also sense the touch position of the object, and drive and sense the stylus pen by using various methods described in the <Table 1> above. Specifically, when the sensor unit 100*a* in FIGS. 9 to 11 is replaced with the sensor unit 100*c* in FIG. 14, the touch input device including the sensor unit 100*c* and control unit 500 in FIG. 14 may perform the touch driving/sensing mode described in FIG. 9, the antenna driving mode described in FIG. 10, and the stylus sensing mode described in FIG. 11 in the same manner. Furthermore, the sensor unit 100*c* in FIG. 14 may be used in one of the methods No. 2 to No. 32 of the <Table 1> above.

Figure 15:
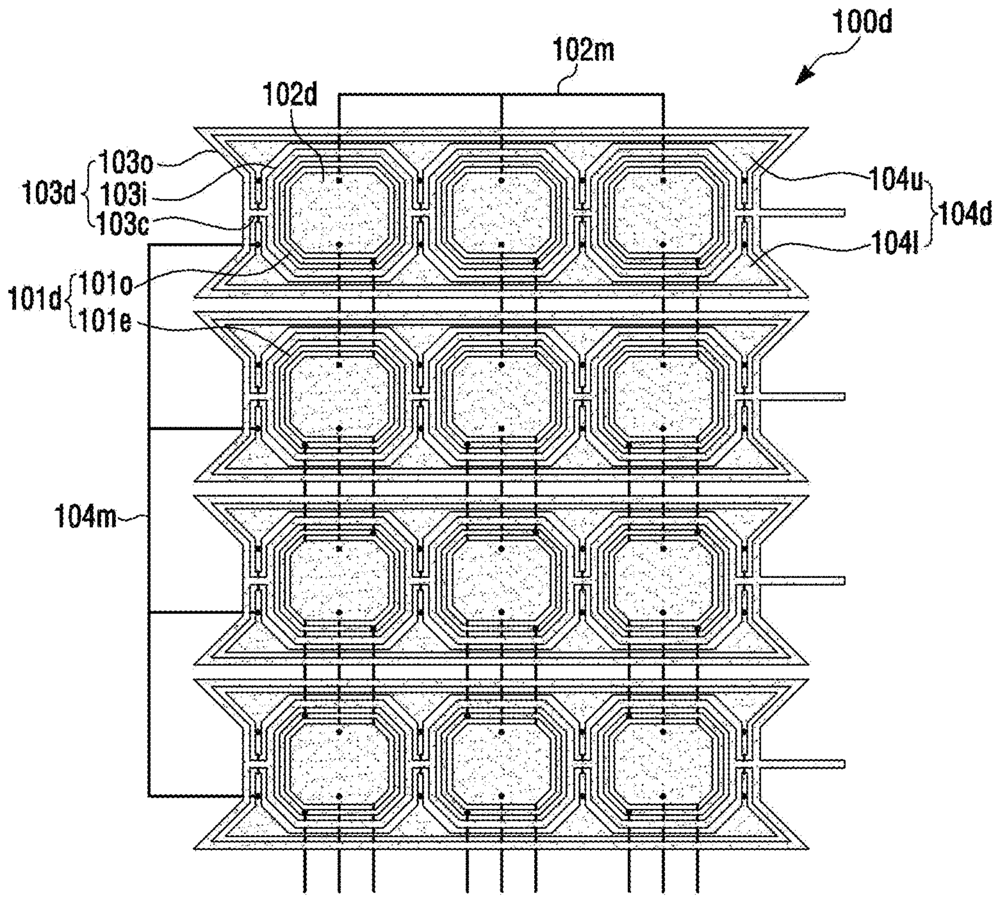
FIG. 15 is a view for explaining a sensor unit **100*d*** included in a touch input device according to a fourth embodiment of the present invention.

FIG. 15 is a view for explaining a sensor unit 100*d* included in a touch input device according to a fourth embodiment of the present invention.

Referring to FIG. 15, the sensor unit 100*d* includes a plurality of first to fourth patterns 101*d*, 102*d*, 103*d*, and 104*d*. The plurality of first to fourth patterns 101*d*, 102*d*, 103*d*, and 104*d* are arranged together on the same layer.

The plurality of first patterns 101*d* are arranged in the first and second directions that are perpendicular to each other. Here, the first direction may be a direction of a major axis of a screen of the touch input device, and the second direction may be a direction of a minor axis of the screen of the touch input device.

Each of the first patterns 101*d* includes a first odd-numbered pattern 101*o* and a first even-numbered pattern 101*e*. The plurality of first patterns 101*d* include a plurality of first odd-numbered patterns 101*o* and a plurality of first even-numbered patterns 101*e*, and one first odd-numbered pattern 101*o* and one first even-numbered pattern 101*e* are arranged alternately in the first direction.

The plurality of first odd-numbered patterns 101*o* arranged in the first direction are electrically connected to each other by a plurality of conductive patterns, and the plurality of first even-numbered patterns 101*e* arranged in the first direction are also electrically connected to each other by a plurality of conductive patterns. Here, the plurality of first odd-numbered patterns 101*o* arranged in the second direction are not electrically connected to each other. Also, the plurality of first even-numbered patterns 101*e* arranged in the second direction are also not electrically connected to each other.

Each of the first odd-numbered pattern 101*o* and the first even-numbered pattern 101*e* may have a rectangular shape. In case of the rectangular shape, the shape may be a polygon having at least four sides. Although not shown in the drawing, each of the first odd-numbered pattern 101*o* and the first even-numbered pattern 101*e* have an elliptical or circular shape.

Each of the first odd-numbered pattern 101*o* and the first even-numbered pattern 101*e* may have an opening therein, in which at least one second pattern 102*d* is disposed. The opening may have a shape correspond to that of each of the first odd-numbered pattern 101*o* and the first even-numbered pattern 101*e*.

One first odd-numbered pattern 101*o* has a structure surrounding one second pattern 102*d* so as to be electrically insulated from each other, and one first even-numbered pattern 101e also has a structure surrounding one second pattern 102b so as to be electrically insulated from each other.

The plurality of first patterns 101d arranged in the first direction form the same electrical path as the first pattern 101 in FIG. 4. The plurality of first patterns 101d arranged in the first direction have two input/output channels (or terminals). One channel is a channel in which the plurality of first odd-numbered patterns 101o arranged in the first direction are electrically connected to each other by conductive patterns, and the other channel is a channel in which the plurality of second even-numbered patterns 101e arranged in the first direction are electrically connected to each other by conductive patterns Each of the two channels may be electrically connected to the control unit in FIG. 8.

At least one of the second patterns 102d is disposed in each of the first odd-numbered pattern 101o and the first even-numbered pattern 101e.

The plurality of second patterns 102d arranged in the first direction are electrically connected to each other by a plurality of conductive patterns. Two second patterns disposed adjacent to each other in the first direction may be electrically connected to each other by one conductive pattern. The second pattern disposed at one edge among the plurality of second patterns 102d arranged in the first direction may be electrically connected to the control unit in FIG. 8, and the second pattern 102d disposed at the other edge is electrically connected to the plurality of second patterns arranged in the second direction through the conductive pattern 102m. Through this, the same electrical connection path as the second pattern 102 in FIG. 4 may be configured.

Each of the third patterns 103d has a shape extending in the second direction (or minor axis). One third pattern 103d surrounds the plurality of first patterns arranged in the second direction.

Each of the third patterns 103d disposed at odd-numbered positions in the first direction among the plurality of third patterns 103d has a plurality of openings in which the plurality of first odd-numbered patterns 101o arranged in the second direction are disposed. One first odd-numbered pattern 101o is disposed in each of the openings.

Each of the third patterns disposed at even-numbered positions in the first direction among the plurality of third patterns 103d has a plurality of openings in which the plurality of first even-numbered patterns 101e arranged in the second direction are disposed. One first even-numbered pattern 101e is disposed in each of the openings.

Each of the third patterns 103d may include a third outer pattern 1030, a plurality of third inner patterns 103i, and a plurality of third connection patterns 103c.

The third outer pattern 1030 may have a shape corresponding to an outer shape of the third pattern 103d and have a closed curve shape extending in the second direction. The plurality of third inner patterns 103i and the plurality of third connection patterns 103c are disposed in one third outer pattern 1030.

The plurality of third inner patterns 103i are arranged in the second direction in one third outer pattern 1030. One third inner pattern 103i has a rectangular or elliptical shape and includes an opening in which one first odd-numbered pattern 101o (or one first even-numbered pattern 101e) is disposed. The opening may have a shape corresponding to an outer shape of the third inner pattern 103i.

The plurality of third connection patterns 103c electrically connect the plurality of third inner patterns 103i arranged in the second direction and electrically connect the third inner patterns disposed at both edges, respectively, among the plurality of third inner patterns 103i arranged along the second direction to the first outer pattern 1030.

Each of the plurality of fourth patterns 104d has a shape extending in the second direction and is disposed adjacent to the third pattern 103d.

The other ends of the plurality of fourth patterns 104d may be electrically connected to each other through the conductive pattern 104m.

Each of the plurality of fourth patterns 104d is disposed in one third pattern 103d. More specifically, the fourth pattern 104d may be disposed in an opening (or inner opening) defined by the third outer pattern 1030, the plurality of third inner patterns 103i, and the plurality of third connection patterns 103c of the third pattern 103d.

The fourth pattern 104d may include a fourth upper pattern 104u and a fourth lower pattern 1041. A predetermined space may be defined between the third outer pattern 1030 and the plurality of third inner patterns 103i, the predetermined space may be divided into two openings by the plurality of third connection patterns 103c, the fourth upper pattern 104u may be disposed in the upper opening of the two openings, and the fourth lower pattern 1041 may be disposed in the lower opening of the two openings. Shapes of the fourth upper pattern 104u and the fourth lower pattern 1041 may correspond to those of the upper opening and the lower opening, respectively.

The fourth upper pattern 104u and the fourth lower pattern 1041 may be electrically connected to each other by a conductive pattern that extends in the first direction and crosses the third connection patterns 103c.

The sensor unit 100d in FIG. 15 may replace the sensor unit 100a in FIG. 8. Thus, the sensor unit 100d in FIG. 15 may also sense the touch position of the object, and drive and sense the stylus pen by using the various methods described in the <Table 1> above. Specifically, when the sensor unit 100a in FIGS. 9 to 11 is replaced with the sensor unit 100d in FIG. 15, the touch input device including the sensor unit 100d and control unit 500 in FIG. 15 may perform the touch driving/sensing mode described in FIG. 9, the antenna driving mode described in FIG. 10, and the stylus sensing mode described in FIG. 11 in the same manner. Furthermore, the sensor unit 100d in FIG. 15 may be used in one of the methods No. 2 to No. 32 of the <Table 1> above.

Figure 16:
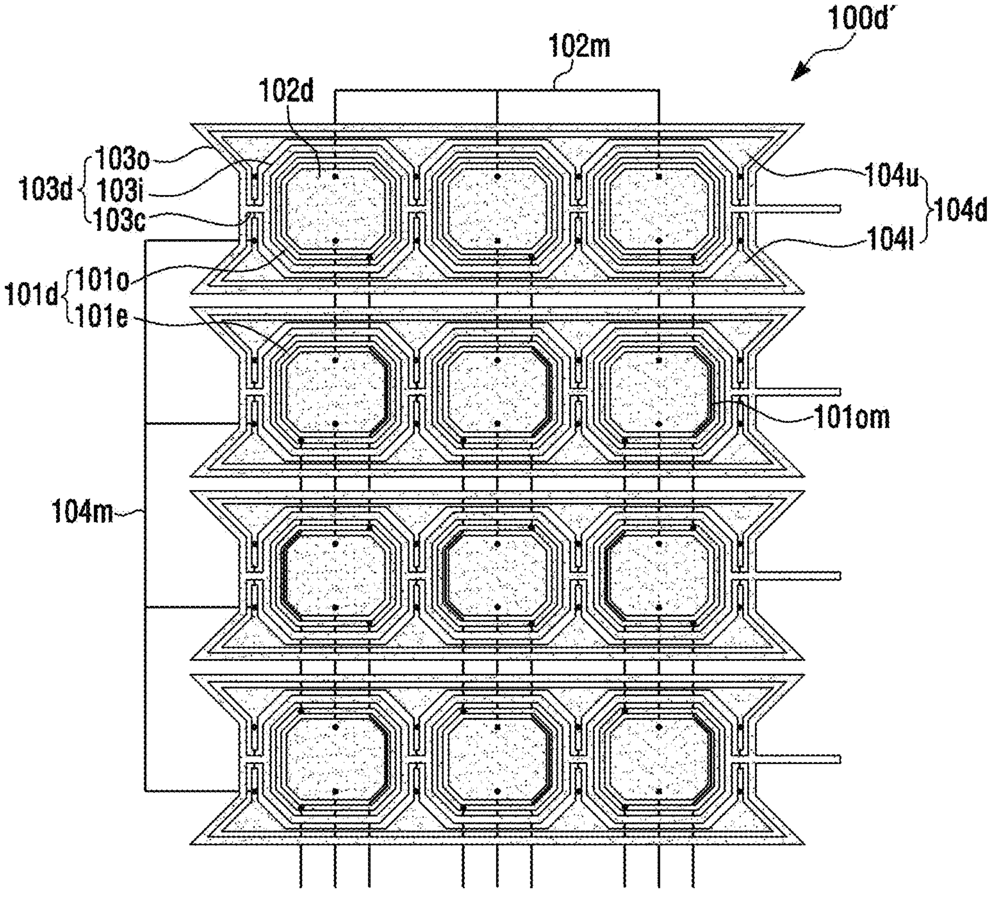
FIG. 16 is a view for explaining a modified example of the sensor unit **100*d* in FIG. 15**.

FIG. 16 is a view for explaining a modified example of the sensor unit 100d in FIG. 15.

First to fourth patterns 101d, 102d, 103d, and 104d of a sensor unit 100d' in FIG. 16 have the same structure and shape as those of the first to fourth patterns 101d, 102d, 103d, and 104d of the sensor unit 100d in FIG. 15. Thus, a description of the structure and shape of the first to fourth patterns 101d, 102d, 103d, and 104d is replaced with the above description.

The sensor unit 100d' in FIG. 16 has a difference from the sensor unit 100d in FIG. 15 in terms of a conductive pattern 101om that electrically connects two first odd-numbered patterns 101o disposed adjacent to each other and two first even-numbered patterns 101e disposed adjacent to each other in the first direction of the first pattern 101d.

The conductive pattern 101om is disposed to bypass so as not to cross the second patterns 102d.

In the sensor unit 100d of FIG. 15, since the conductive pattern that electrically connect two first odd-numbered patterns 101o disposed adjacent to each other and two adjacent first even-numbered patterns 101e disposed adjacent to each other in the first direction has a shape extending linearly in the first direction, the conductive pattern has a portion overlapping the second patterns 102*d*. A predetermined capacitance may be formed between the conductive pattern and the second patterns 102*d* in the overlapping portion. The predetermined capacitance may give an effect on touch sensing or stylus sensing sensitivity and may also give an effect on an operation frequency bandwidth.

On the other hand, since the conductive pattern 101*om* of FIG. 15 is disposed to bypass the second pattern 102*d* instead of overlapping the second patterns 102*d*, the above-described capacitance may not be formed to reduce the effect on the touch sensing and the stylus sensing sensitivity and also reduce the effect on the operation frequency bandwidth.

On the other hand, since the conductive pattern of FIG. 15 is shorter in length than the conductive pattern 101*om* of FIG. 16, the conductive pattern of FIG. 15 has a resistance less than that of the conductive pattern 101*om* of FIG. 16.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

DESCRIPTION OF REFERENCE NUMERALS

100, 100*a*, 100*b*, 100*b*', 100*c*, 100*d*, 100*d*': Sensor unit
101, 101*a*, 101*b*, 101*c*, 101*d*: First pattern
102, 102*a*, 102*b*, 102*c*, 102*d*: Second pattern
103, 103*a*, 103*b*, 103*c*, 103*d*: Third pattern
104, 104*a*, 104*b*, 104*c*, 104*d*: Fourth pattern

The invention claimed is:

1. A touch input device comprising:
a sensor unit; and
a control unit electrically connected to the sensor unit,
wherein the sensor unit comprises:
a plurality of first patterns each arranged along a first direction;
a plurality of second patterns each arranged along the first direction and adjacent to the first patterns;
a plurality of third patterns each arranged along a second direction intersecting the first direction; and
a plurality of fourth patterns each arranged along the second direction and adjacent to the third patterns,
wherein each of the first pattern includes a first-a pattern and a first-b pattern alternately arranged along the first direction,
wherein the first-a patterns of the plurality of first patterns arranged along the first direction being electrically connected to each other, the first-b patterns of the plurality of first patterns arranged along the first direction being electrically connected to each other,
wherein one end of each of the plurality of first patterns is electrically floated, and the other end of each of the plurality of first patterns is electrically connected to the control unit,
wherein one end of each of the plurality of third patterns is electrically floated, and the other end of each of the plurality of third patterns is electrically connected to the control unit,
wherein one ends of the plurality of second patterns are electrically connected to each other, and at least two of the other ends are electrically connected to each other and electrically connected to the control unit, and
wherein at least some of the fourth patterns among the plurality of fourth patterns have one ends electrically floating, and the other ends are electrically connected to each other.

2. The touch input device of claim 1,
wherein the first to fourth patterns are disposed together on the same layer,
wherein each of the plurality of first patterns has an opening therein, in which the second pattern is disposed, and
wherein at least one third pattern is disposed at each of both sides based on the first pattern and has an opening therein, in which the fourth pattern is disposed.

3. The touch input device of claim 2, wherein the sensor unit further includes conductive patterns electrically connecting the first-a patterns arranged along the first direction to each other, and wherein the conductive patterns extend along the first direction and are disposed such that at least a portion thereof overlaps with the third and fourth patterns.

4. The touch input device of claim 2, wherein the sensor unit further includes conductive patterns electrically connecting the first-a patterns arranged along the first direction to each other, and wherein the conductive patterns are disposed to bypass the third patterns so as not to overlap with the third and fourth patterns.

5. The touch input device of claim 2, wherein the first pattern comprises an inverted triangle pattern, a triangle pattern, and a connection pattern configured to connect the inverted triangle pattern and the triangular pattern,
wherein the opening of the first pattern has a shape corresponding to an outer shape of the first pattern,
wherein the second pattern has a shape corresponding to that of the opening of the first pattern, and
wherein the third pattern has a rectangular, polygonal, circular, or elliptical shape.

6. The touch input device of claim 1, wherein the control unit is configured to control the sensor unit to operate in any one of a touch driving/sensing mode for sensing a touch position of an object, a stylus driving mode for driving a stylus pen, and a stylus sensing mode for sensing a touch position of the stylus pen,
wherein, in the touch driving/sensing mode, the control unit is configured to:
apply a touch driving signal to the plurality of third patterns;
receive a first touch sensing signal through the first-a patterns arranged along the first direction;
receive a second touch sensing signal through the first-b patterns arranged along the first direction; and sense the touch position based on a signal obtained by subtracting the second touch sensing signal from the first touch sensing signal, and wherein, in the stylus driving mode, the control unit is configured to apply a pen driving signal for driving the stylus pen to the plurality of second patterns or the plurality of third patterns.

7. The touch input device of claim 6, wherein, in the stylus sensing mode, the control unit is configured to receive a pen sensing signal from the stylus pen through the plurality of first patterns and the plurality of third patterns.

8. The touch input device of claim 6, wherein, in the stylus driving mode, the pen driving signal is applied to the plurality of third patterns and the pen driving signal is transferred from the plurality of third patterns to the plurality of fourth patterns by a capacitive coupling.

9. The touch input device of claim 6, wherein, in the stylus sensing mode, the pen sensing signal is transferred from the plurality of second patterns to the plurality of first patterns by a capacitive coupling, and is transferred from the plurality of fourth patterns to the plurality of third patterns by the capacitive coupling.

10. The touch input device of claim 1, wherein the sensor unit comprises first to fourth patterns disposed together on the same layer, wherein each of the plurality of first patterns has an opening therein, in which the second pattern is disposed, wherein the second pattern has an opening in which the third pattern is disposed, and wherein the third pattern has an opening in which the fourth pattern is disposed.

11. The touch input device of claim 10, wherein the control unit is configured to control the sensor unit to operate in any one of a touch driving/sensing mode for sensing a touch position of an object, a stylus driving mode for driving a stylus pen, and a stylus sensing mode for sensing a touch position of the stylus pen, wherein, in the touch driving/sensing mode, the control unit is configured to:

apply a touch driving signal to the plurality of third patterns;

receive a first touch sensing signal through the first-a patterns arranged along the first direction;

receive a second touch sensing signal through the first-b patterns arranged along the first direction; and sense the touch position based on a signal obtained by subtracting the second touch sensing signal from the first touch sensing signal, and wherein, in the stylus driving mode, the control unit is configured to apply a pen driving signal for driving the stylus pen to the plurality of second patterns or the plurality of third patterns.

12. The touch input device of claim 1, wherein the sensor unit comprises first to fourth patterns disposed together on the same layer, wherein the plurality of first patterns has an opening therein, in which the second pattern is disposed, and wherein the third patterns has a shape extending in the second direction, is arranged to surround the first patterns arranged in the second direction, and has an opening in which the fourth pattern is arranged.

13. The touch input device of claim 12, wherein the third pattern comprises a third outer pattern, a plurality of third inner patterns, and a plurality of third connection patterns, wherein the third outer pattern has a shape corresponding to an outer shape of the third pattern and has a closed curve shape extending in the second direction, wherein the plurality of third inner patterns are arranged in the second direction in one third outer pattern, and wherein the plurality of third connection patterns electrically connect the plurality of third inner patterns arranged in the second direction and electrically connect the third inner patterns disposed at both edges, respectively, among the plurality of third inner patterns arranged in the second direction to the first outer pattern.

14. The touch input device of claim 13, wherein the fourth pattern comprises a fourth upper pattern and a fourth lower pattern electrically connected to each other, wherein the fourth upper pattern is arranged in an upper opening defined by an upper portion of the third outer pattern, the plurality of third inner patterns, and the plurality of third connection patterns, and wherein the fourth lower pattern is arranged in a lower opening defined by a lower portion of the third outer pattern, the plurality of third inner patterns, and the plurality of third connection patterns.

15. The touch input device of claim 12, wherein the sensor unit further includes conductive patterns electrically connecting the first-a patterns arranged along the first direction to each other, and wherein the conductive patterns extend along the first direction and are disposed such that at least a portion thereof overlaps the second patterns.

16. The touch input device of claim 12, the sensor unit further includes conductive patterns electrically connecting the first-a patterns arranged along the first direction to each other, and wherein the conductive patterns are disposed to bypass the second patterns so as not to overlap the second patterns.

17. The touch input device of claim 1, wherein the first and second patterns arranged together on a first layer and the third and fourth patterns arranged together on a second layer spaced apart from the first layer, and wherein the third pattern has a shape extending in the second direction and has an opening in which the fourth pattern is disposed.

18. The touch input device of claim 17, wherein the first pattern comprises an inverted triangle pattern, a triangle pattern, and a connection pattern configured to connect the inverted triangle pattern and the triangular pattern, wherein the opening of the first pattern has a shape corresponding to an outer shape of the first pattern, wherein the second pattern has a shape corresponding to that of the opening of the first pattern, wherein the third pattern comprises a plurality of diamond patterns and a connection pattern configured to connect two adjacent diamond patterns among the plurality of diamond patterns, wherein the opening of the third pattern has a shape corresponding to an outer shape of the third pattern, and wherein the fourth pattern has a shape corresponding to that of the opening of the third pattern.

19. The touch input device of claim 17, wherein the control unit is configured to control the sensor unit to operate in any one of a touch driving/sensing mode for sensing a touch position of an object, a stylus driving mode for driving a stylus pen, and a stylus sensing mode for sensing a touch position of the stylus pen, wherein, in the touch driving/sensing mode, the control unit is configured to:

apply a touch driving signal to the plurality of third patterns;

receive a first touch sensing signal through the first-a patterns arranged along the first direction;

receive a second touch sensing signal through the first-b patterns arranged along the first direction; and sense the touch position based on a signal obtained by subtracting the second touch sensing signal from the first touch sensing signal, and wherein, in the stylus driving mode, the control unit is configured to apply a pen driving signal for driving the stylus pen to the plurality of second patterns or the plurality of third patterns.

* * * * *